US007521003B2

(12) United States Patent
Gin et al.

(10) Patent No.: US 7,521,003 B2
(45) Date of Patent: Apr. 21, 2009

(54) FUNCTIONALIZED NANOSTRUCTURED LYOTROPIC LIQUID CRYSTAL POLYMERS

(75) Inventors: Douglas L. Gin, Longmont, CO (US); Weiqiang Gu, Taunton, MA (US); Yanjie Xu, Boulder, CO (US); Cory Pecinovsky, Longmont, CO (US)

(73) Assignee: The Regents of the University of Colorado, Boulder, CO (US)

( * ) Notice: Subject to any disclaimer, the term of this patent is extended or adjusted under 35 U.S.C. 154(b) by 401 days.

(21) Appl. No.: 10/544,322

(22) PCT Filed: Feb. 13, 2004

(86) PCT No.: PCT/US2004/004242

§ 371 (c)(1),
(2), (4) Date: Mar. 15, 2006

(87) PCT Pub. No.: WO2004/081979

PCT Pub. Date: Sep. 23, 2004

(65) Prior Publication Data

US 2006/0194927 A1    Aug. 31, 2006

Related U.S. Application Data

(60) Provisional application No. 60/447,664, filed on Feb. 14, 2003.

(51) Int. Cl.
*C09K 19/00* (2006.01)
*C09K 19/52* (2006.01)
*G02F 1/03* (2006.01)

(52) U.S. Cl. .................. 252/299.01; 428/1.1; 428/1.2; 428/1.3; 430/20

(58) Field of Classification Search ........... 428/1.1–1.3; 252/299.01; 430/20
See application file for complete search history.

(56) References Cited

U.S. PATENT DOCUMENTS

| 4,614,524 | A | 9/1986 | Kraus |
| 5,238,613 | A | 8/1993 | Anderson |
| 5,670,051 | A | 9/1997 | Pinnau et al. |
| 5,849,215 | A | 12/1998 | Gin et al. |
| 6,586,561 | B1 | 7/2003 | Litt et al. |
| 7,090,788 | B2* | 8/2006 | Elliott .................. 252/299.01 |
| 2006/0096922 | A1 | 5/2006 | Gin et al. |
| 2006/0194927 | A1* | 8/2006 | Gin et al. .................. 525/330.7 |
| 2008/0029735 | A1 | 2/2008 | Gin et al. |

FOREIGN PATENT DOCUMENTS

WO    WO 98/30318    7/1998

OTHER PUBLICATIONS

Anderson et al. (1964) "The Use of Esters of N-Hydroxysuccinimide in Peptide Synthesis," *J. Am. Chem. Soc.* 86(9):1839-1842.
Beginn et al. (2000) "Membranes Containing Oriented Supramolecular Transport Channels," *Adv. Mater.* 12:513-516.
Beginn et al. (2000) "Functional Membranes Containing Ion-Selective Matrix Fixed Supramolecular Channels," *Adv. Mater.* 12:510-516.
Beginn, U. (1998) "Supramolecular Templates as Porogenes," *Adv. Mater.* 10(16):1391-1394.
Benaglia, M. (Apr. 2002) "Poly(ethyleneglycol)-supported Chiral Imidazolidin-4-one: An Efficient Organic Catalyst for the Enantioselective Diels-Alder Cycloaddition," *Adv. Synth. Catal.* 2002, 344(2), 149-152.
Deng et al. (1998) "Polymerizable Lyotropic Liquid Crystals Containing Transition-Metal and Lanthanide Ions: Architectural Control and Introduction of New Properties into Nanostructured Polymers," *J. Am. Chem. Soc.* 120(14):3522-3523.
Eastoe et al. (2000) "Control Over Phase Curvature Using Mixtures of Polymerizable Surfactants," *Chem. Mater.* 12:3533-3537.
Gin et al. (1999) "Polymerizable Liquid Crystals as Building Blocks for Functional, Nanostructured Materials," *Synthetic Lett.* 10:1509-1522.
Gin et al. (Sep. 2001) "Nanoporous Catalytic Materials with Organic Frameworks," *Adv. Mater.* 13(18):1407-1410.
Gin et al. (Oct. 2001) "Polymerized Lyotropic Liquid Crystal Assemblies for Materials Applications," *Acc. Chem. Res.* 34:973-980.
Gin et al. (2005) "Recent Advances in the Design of Polymerizable Lyotropic Liquid-Crystal Assemblies for Heterogeneous Catalysis and Selective Separations," Adv. Funct. Mater. 16(7), 865-878.
Gottarelli et al. (1999) "A New Lyotropic Liquid Crytalline Phase Formed in Hydrocarbon Solvents by e Deoxyguanosine Derivative Through Extensive Hydrogen Bonding," *Liq. Crys.* 26:965-971.
Gray et al. (1998) "Polymerizable Lyotropic Liquid Crystals Containing Transition-Metal Ions as Building Blocks for Nanostructured Polymers and Composites," *Chem. Mater.* 10:1827-1832.
Gu et al. (Jun. 2001) "A Nanostructured, Scandium-Containing Polymer for Heterogeneous Lewis Acid Catalysis in Water," *Chem. Mater.* 16(6):1949-1951.

(Continued)

*Primary Examiner*—Geraldina Visconti
(74) *Attorney, Agent, or Firm*—Faegre & Benson, LLP

(57) ABSTRACT

The invention provides cross-linked lyotropic liquid crystal (LLC) copolymers having ordered nanometer-sized pores lined with functional groups. The copolymers are formed by copolymerizing LLC monomers with strong LLC character and functionalized monomers with no or weak LLC character to form an LLC phase. Both the LLC monomers and the functionalized monomers contain hydrogen-bonding groups and hydrogen-bonding is believed to assist in the formation of the LLC phase of the blended mixture. Different classes of functional groups useful for the invention include, but are not limited to, acidic groups, basic groups, catalytic groups, oxidizing agents, reducing agents, polymerization initiators, binding agents, optically active groups, and electrically active groups. The invention also provides methods for making the cross-linked LLC copolymers of the invention. In these methods, the LLC monomer and the functionalized monomer are blended in a polar solvent, thereby allowing self-assembly of the first and second monomer into an LLC phase. The LLC phase in then cross-linked with retention of the LLC microstructure.

35 Claims, 14 Drawing Sheets

OTHER PUBLICATIONS

Hammond et al. (Sep. 2002) "Synthesis and Lyotropic Liquid Crystalline Behavior of a Taper-Shaped, Phosphonic Acid Amphiphile," *Liq. Cryst.* 29(9):1151-1159.

International Search Report. Corresponding to International Application No. PCT/US04/04242, Mailed Mar. 7, 2005.

Kanie et al. (Jun. 2001) "Hydrogen-Bonded Lyotropic Liquid Crystals of Folic Acids: Responses to Environment by Exhibiting Different Complex Patters," *Chem. Lett.* 30(6) 480-481.

Krapcho et al. (1990) "Mono-Protected Diamines. N-tert-Butoxycarbonyl-$_{\alpha\omega}$-Alkanediamines from $_{\alpha\omega}$-Alkanediamines," *Syn. Commun.* 20(16):2559-2564.

Lee et al. (1995) "Polymerization of Non-Lamellar Assemblies," *J. Am. Chem. Soc.* 177:5573-5578.

Lester et al. (Jun. 2002) "Ordering Effects on the Photopolymerization of a Lytropic Liquid Crystal," *Polymer*, 43(13), 3707-3715.

Liu et al. (1998) "Diblock Thin Film with Densely Hexagonally Packed Nanochannels," *Adv. Mater.* 10:69-71.

Liu et al. (2000) "Nanofiltration Membranes Prepared by Direct Microemulsion Copolymerization Using Poly(Ethylene Oxide) Macromonomer as a Polymerizable Surfactant," *J. Appl. Polym. Sci.* 77:2785-2794.

Miller et al. (1999) "Heterogenous Catalysis with Cross-Linked Lyotropic Liquid Crystal Assemblies: Organic Analogues to Zeolites ad Mesoporous Sieves," *Angew. Chem. Int. Ed.* 38(20):3021-3026.

Miller et al. (1999) "Nanostructured Materials Based on Polymerizable Amphiphiles," *Curr. Opin. Colloid Interface Sci.* 4:338-347.

Mueller et al. (Feb. 2002) "Supermolecular Materials via Polymerization of Mesophases of Hydrated Amphiphiles," *Chem. Rev.* 102:727-758.

Northrup et al. (Feb. 2002) "The First General Enatioselective Catalytic Diels-Alder Reaction with Simple α,β-Unsaturated Ketones," *J. Am. Chem. Soc.* 11:2458-2460.

O'Brien et al. (1998) "Polymerization of Preformed Self Organized Assemblies," *Acc. Chem. Res.* 31:861-868.

Paleos et al. (1997) "Molecular Recognition of Organized Assemblies via Hydrogen Bonding in Aqueous Media," *Adv. Mater.* 9(9):695-710.

Pindzola et al. (2001) "Polymerization of Phosphonium-Diene Based Gemini Surfactants in the Regular Hexagonal and Bi-Continuous Cubic Phases," *Abstracts of Papers of the Am. Chem. Soc.* 22$^{nd}$ National Meeting, Aug. 26-30, Chicago, Il.

Pindzola et al. (Apr. 2001) "Polymerization of a Phosphonium Diene Amphiphile in the Regular Hexagonal Phase with Retention of Microstructure," *J. Am. Chem. Soc.* 123(19):4617-4618.

Pindzola et al. (2003) "Cross-Linked Normal Hexagonal and Bicontinuous Cubic Assemblies via Polymerizable Gemini Amphiphiles," *J. Am. Chem. Soc.* 125(10):2940-2949.

Resel et al. (2000) "Structural Properties of Polymerized Lyotropic Liquid Crystal Phases of 3,4,5-Tris(ω-acryloxyalkoxy)benzoate Salts," *Macromol. Chem. Phys.* 201(11):1128.

Ringsdorf et al. (1988) "Molecular Architecture and Function of Polymeric Oriented Systems. Model for the Study of Organization, Surface Recognition, and Dynamics of Biomembranes," *Angew. Chem. Int. Ed. Engl.* 27:113-158.

Selkala, S. et al. (Oct. 2002), "Asymmetric Organocatalytic Diels-Alder Reactions on Solid Support", *Adv. Synth. Catal.*, 344(9), 941-945.

Srisiri et al. (1997) "Polymerization of the Inverted Hexagonal Phase," *J. Am. Chem. Sci.* 119:4866-4873.

Stein et al. (2000) "Hybrid Inorganic-Organic Mesoporous Silicates—Nanoscopic Reactors Coming of Age," *Adv. Mater.* 12(19):1403-1419.

Tiddy, G.J.T. (1980) "Surfactant-Water Liquid Crystal Phases," *Phys. Rep.* 57:1-46.

Winsor, P. (1968) "Binary and Multicomponent Solutions of Amphiphilic Compounds Solubilization and the Formation, Structure, and Theoretical Significance of Liquid Crystalline Solutions," *Chem. Rev.* 68:1-40.

Xu et al. (2004) "Heterogeneous Catalysis Using a Nanostructured Solid Acid Resin Based on Lyotropic Liquid Crystals," *J. Am. Chem. Soc.* 126(6):1616-1617.

Yamada et al. (Jan. 2001) "Lyotropic Aggregate of Trioeotide Derivatives within Organic Solvents: Relationship Between Interpeptide Hydrogen Bonding and Packing Arrangements of Components," *Langmuir* 17:961-963.

Zhou et al. (2000) "Synthesis and Characterization of Novel Nanostructured Polymers Enhanced by Hydrogen-bonding Using Liquid Crystal Monomers," *Poly. Prepr., Am. Chem. Soc., Div. Polym. Chem.*, 41(2): 1330-1331.

Zhou et al. (2003) "Assembly of Acidic Amphiphiles into Inverted Hexagonal Phases Using an L-Alanine-Based Surfactant as a Structure-Directing Agent," *Langmuir* 19:6346-6348.

\* cited by examiner

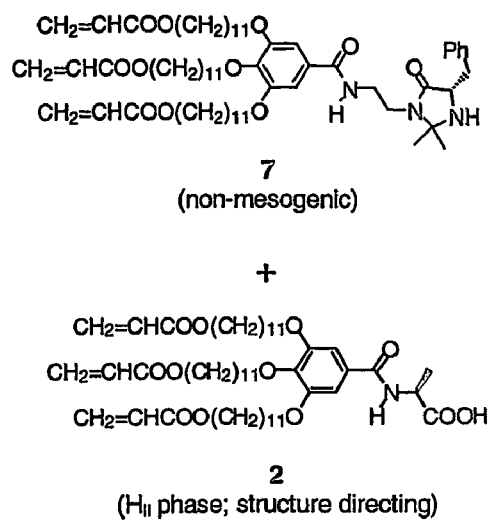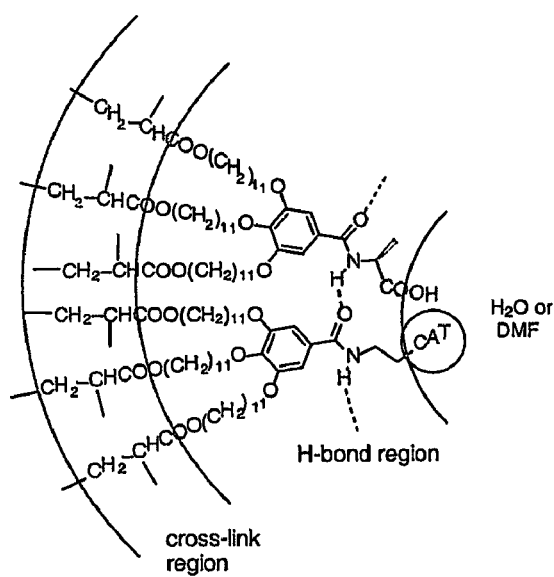
Figure 2

FUNCTIONALIZED NANOSTRUCTURED LYOTROPIC LIQUID CRYSTAL POLYMERS

CROSS-REFERENCE TO RELATED APPLICATIONS

This application is the National Stage of International Application No. PCT/US2004/004242, filed Feb. 13, 2004, which claims the benefit of U.S. Provisional Application No. 60/447,664, filed Feb. 14, 2003.

STATEMENT REGARDING FEDERALLY SPONSORED RESEARCH OR DEVELOPMENT

This application was made at least in part with government support from the National Science Foundation under grant DMR-0111193. The United States government has certain rights in this invention.

BACKGROUND OF THE INVENTION

This invention is in the field of lyotropic liquid crystal (LLC) polymers, in particular cross-linked LLC copolymers having ordered nanometer-sized pores lined with functional groups. The copolymers are formed by copolymerizing LLC monomers with strong LLC character and functionalized monomers with no or weak LLC character to form an LLC phase. Both monomers contain hydrogen-bonding groups, and hydrogen-bonding is believed to assist in the formation of the LLC phase of the blended mixture.

LLC mesogens are amphiphilic molecules containing one or more hydrophobic organic tails and a hydrophilic headgroup. The amphiphilic character of these molecules encourages them to self-organize into aggregate structures in solution at sufficiently high amphiphile concentration. These aggregates can be relatively simple individual structures such as micelles and vesicles. These aggregates can also be ordered yet fluid condensed assemblies with specific nanometer-scale geometries known collectively as LLC phases. LLC phases include the normal hexagonal phase, the lamellar phase, the bicontinuous cubic phase, and the inverted hexagonal phase. FIG. 1 illustrates these phases for LLC mesogens with hydrophilic headgroups and hydrophobic organic tails in water. As shown in FIG. 1, the normal hexagonal ($H_I$) phase has rod-like micelles arranged in a hexagonal array. The surface of the rod-like micelles is composed of the hydrophilic head groups, while the hydrophobic tails are isolated inside the micelle. The lamellar phase (L)(bilayer) phase has a double layer of molecules arranged so that the headgroups form the surface of the layer while the hydrophobic tails are isolated inside the layer. In the inverted hexagonal ($H_{II}$) phase, water-filled cylindrical channels are arranged in a hexagonal array. The hydrophilic headgroups surround the channels of water while the hydrophobic tails fill the volume between the channels of water. In the bicontinuous cubic phase, channels of water are connected as a three-dimensional network. The hydrophilic headgroups surround the channels of water.

Nanostructured porous solid materials with catalytic or other functional properties are extremely important in the areas of heterogeneous catalysis, separations, and molecular sorption. The majority of the nanostructured solids used in these applications are based on zeolites and molecular sieves, which are crystalline inorganic materials which can have poor tunability and processibility. For example, there has been recent work in making organic acid-functionalized mesoporous sieve materials based on a nanostructured inorganic silicate matrix, with the strong organic acid groups chemically grafted into the nanochannels (Stein, A.; Melde, B. J.; Schroden, R. C., *Adv. Mater.* 2000, 12 (19), 1403-1419). Although these materials exhibit catalytic activity and have ordered nanochannels, they can suffer from processing and alignment problems since they are brittle and inorganic in nature.

A small number of reports of nanostructured polymers with nanopores containing carboxylic acid groups (COOH) have been reported. Liu et al. reported the ability to make ordered polymers with hexagonal nanochannels (ca. 17 nm I.D.) containing COOH groups via cross-linking and selectively hydrolyzing phase-separated block copolymers (Liu, G.; Ding, D., *Adv. Mater.* 1998, 10, 69.)

The use of cross-linked lyotropic (i.e., amphiphilic) liquid crystal (LC) phases as tunable organic zeolite and molecular sieve "analogues" for heterogeneous catalysis has been proposed. (Gin, D. L.; Gu, W. *Adv. Mater.* 2001, 13 (18), 1407-1410.) Lyotropic LC networks capable of enhanced heterogeneous base and Lewis acid catalysis have been designed. These LLC networks were based on polymerization of single functional monomers, rather than co-polymerization of mixtures of differing monomers. (Miller, S. A.; Kim, E.; Gray, D. H.; Gin, D. L. *Angew. Chem. Int Ed.* 1999, 38 (20), 3021-3026; Gu, W.; Zhou, W.-J.; Gin, D. L., *Chem. Mater.* 2001, 13 (6), 1949-1951.).

Formation of hydrogen-bonded LLC phases in nonpolar solution has been reported in the scientific literature. Because the solvent is nonpolar, the LLC phases are typically different than those shown in FIG. 1. Nonpolar solvents are also less likely than polar solvents to compete in hydrogen bonding between solute molecules. Gottttarelli et al. (Gottarelli, G.; Masiero, S.; Mezzina, E.; Pieraccini, S.; Spada, G. P. *Liq. Cryst.* 1999, 26, 965) report formation of a lyotropic crystalline phase between identical deoxyguanosine derivatives in hydrocarbon solvents. The proposed structure for the gel-like phase was a structure formed by ribbon-like elements containing guanine residues in an extended hydrogen-bonded configuration, while didacanoyl chains, together with the hydrocarbon solvent, fill the lateral gap between the ribbons. Kanie et al. (Kanie, K.; Yasuda, T.; Nishii, M.; Ujiie, S.; Kato, T. *Chem. Lett.* 2001, 480) report formation of ribbon-like and disk-like aggregations between identical folic acid derivatives in dodecane.

Formation of hydrogen-bonded disk-like aggregates in water between an equimolar mixture of a melamine derivative and an isocyanuric acid derivative has also been reported (Paleos, C. M.; Tsiourvas, D. *Adv. Mater.* 1997, 9, 695). A bi-layer structure was proposed, with each layer consisting of a hydrogen bonded array of the two molecules.

There remains a need for nanostructured organic materials with a range of architectures which can be functionalized with a broad range of functional groups.

SUMMARY OF THE INVENTION

In an embodiment, the invention provides functionalized nanostructured organic materials in the form of cross-linked co-polymerized lyotropic liquid crystal polymers comprising ordered nanopores, the walls of the nanopores comprising a multiplicity of functional groups. The use of a co-polymerized LLC polymer can overcome inherent problems in designing LLC starting materials that can (1) self-assemble into a specific LLC phase, (2) incorporate polymerization reactivity, and (3) carry a third functional property of interest (e.g. a specific catalytic species or molecular receptor), in a single molecular platform. The molecular components that give rise to each of these three properties may not be compatible with each other in the same molecule. For example, it was discovered that amphiphiles with relatively strong acid groups (SO₃H, PO₃H₂) do not make good LLCs (Zhou, W.-J. et al., Langmuir 2003, 19, 6346, Hammond, S. R.; et al. Liq. Cryst. 2002, 29 (9), 1151). The present invention allows some of these properties to be separated into two sets of molecules, each performing separate roles in the resulting mixture. This allows a much broader range of functional properties to be successfully incorporated into cross-linked LLC materials, thereby broadening the scope and utility of these solid-state polymer materials in applications ranging from heterogeneous catalysis to separations to sorption.

The nanostructured LLC polymers of the invention are co-polymers of at least a first and a second monomer. The first monomer is an LLC monomer having strong LLC character and comprising a first headgroup, a first polymerizable platform, and a first hydrogen-bonding linkage between the first headgroup and the first polymerizable platform. The second monomer has either weak or no LLC character and comprises a second headgroup comprising a functional group, a second polymerizable platform, and a second hydrogen-bonding linkage between the second headgroup and the second polymerizable platform.

The functionalized nanostructured LLC polymers of the invention have ordered, monodisperse nanometer sized pores that are lined with functional groups. The ordering and size of the pores is determined by the LLC phase formed by the combination of monomers. Uniform and controllable architectures on the nano-scale can result in materials with enhanced reactivity and/or selectivity. For example, an ordered, cross-linked sulfonic acid network was found to have over one order of magnitude higher reaction selectivity than commercial sulfonic acid resins that were non-ordered in nature (i.e., amorphous). The nanostructured LLC polymer was a co-polymer of monomer 1 and monomer 2. Furthermore, the use of organic-based starting materials can allow a high degree of chemical tunability and processibility (Xu, Y.; Gu, W.; Gin, D. L. J. Am. Chem. Soc. 2004, 126 (6), 1616-1617).

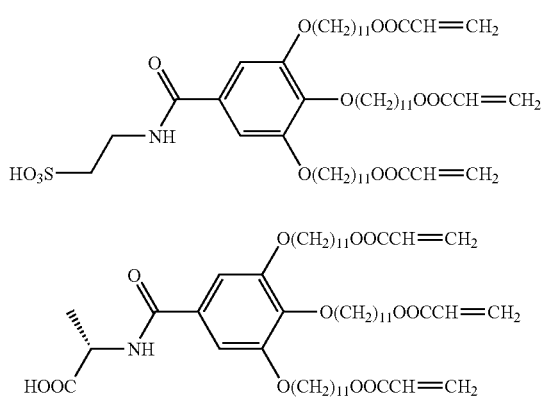

Different classes of functional groups include, but are not limited to, acidic groups, basic groups, catalytic groups, oxidizing agents, reducing agents, polymerization initiators, binding agents, optically active groups, and electrically active groups. Each of these classes, and the subclasses within, is individually seperable. A particular class or subclass may be combined with any of the other classes or subclasses. In addition, some functional groups may belong to more than one class. For example, the Diels-Alder organocatalyst of Compound 8 is a chiral/optically active catalytic entity.

In an embodiment, the invention also provides a method for preparing a cross-linked functionalized lyotropic liquid crystal polymer comprising the steps of:

a. providing a first monomer which is a lyotropic liquid crystal monomer having strong LLC character, the first monomer comprising a first headgroup, a first polymerizable platform, and a first hydrogen-bonding linkage between the first headgroup and the first polymerizable platform;

b. providing a second monomer having either weak or no LLC character, the second monomer comprising a second headgroup comprising a functional group, a second polymerizable platform, and a second hydrogen-bonding linkage between the second headgroup and the second polymerizable platform;

c. blending the first monomer, the second monomer and a polymerization initiator in a polar solvent, thereby allowing self-assembly of the first and second monomer into an LLC phase having an LLC microstructure; and d. cross-linking the LLC phase with retention of the LLC microstructure.

In the methods of the invention, hydrogen bonding between the first and the second monomer aids in formation of the desired lyotropic liquid crystal phase. FIG. 2 schematically illustrates the formation of hydrogen bonds between monomers 2 and 7. The lyotropic liquid crystal phase formed is the same as that formed by the first monomer, therefore, the first monomer can be said to act as a structure-directing agent. Preferred lyotropic liquid crystal phases are the inverse hexagonal phase and bicontinuous cubic phases, both of which typically produce solvent channels lined by hydrophilic head groups. In the methods of the invention, the solvent channels are lined by the functional head groups of monomer 7 as well as the hydrophilic head groups of monomer 2, as shown in FIG. 2.

BRIEF DESCRIPTION OF THE FIGURES

FIG. 2: Illustration of H-bond assisted LLC phase formation between a non-mesogenic monomer and a strong $H_{II}$ LLC mesogen.

DETAILED DESCRIPTION OF THE INVENTION

Figure 1:
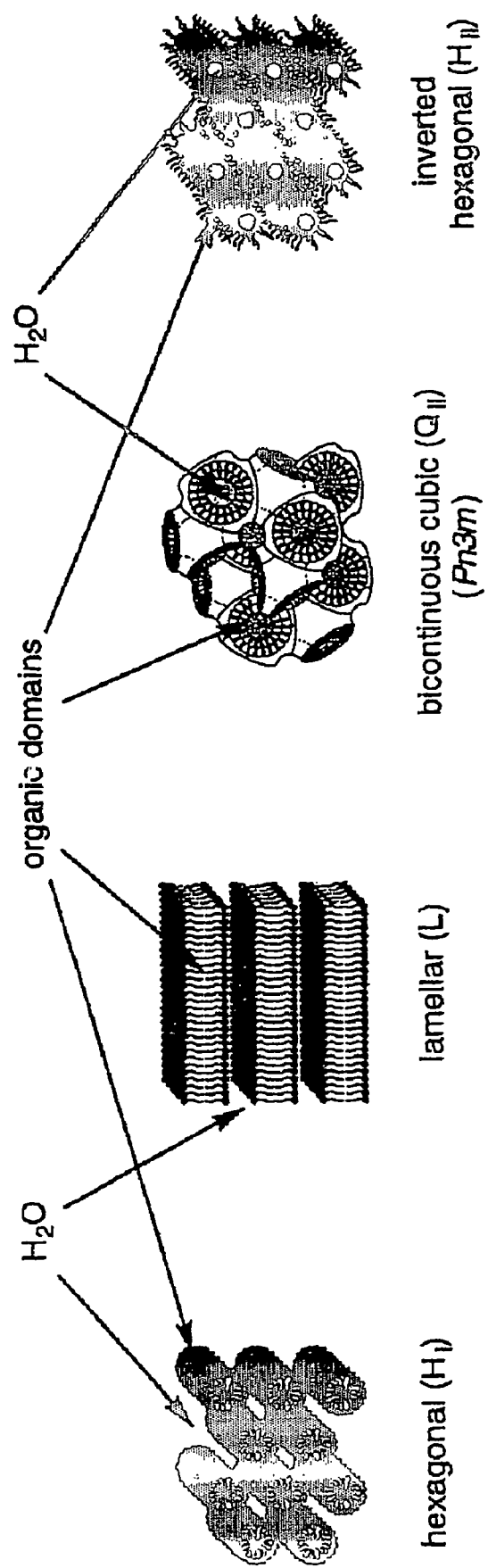
FIG. 1: Lyotropic Liquid Crystal Phases

In an embodiment, the invention provides a cross-linked co-polymerized lyotropic liquid crystal (LLC) polymer comprising ordered nanopores, the walls of the nanopores comprising a multiplicity of functional groups. As used herein, an LLC polymer is comprised of polymerized LLC monomers in an ordered assembly characteristic of an LLC phase. The LLC polymer may further comprise monomers with no LLC character. The LLC polymer may have domains of differing orientation. In an embodiment, the LLC phase is the inverse hexagonal phase or a bicontinuous cubic phase, both of which have microstructures with open channels.

As used herein, an LLC monomer is a polymerizable amphiphilic molecule that, when combined with identical LLC monomers and a suitable solvent (e.g., water), spontaneously self-assembles into an LLC phase. LLC mesogens are amphiphilic molecules containing a hydrophilic headgroup and one or more hydrophobic organic tails. A monomer with no LLC character is a molecule that, when combined with identical monomers, does not spontaneously self-assemble into an LLC phase.

The cross-linked co-polymerized LLC polymers of the invention are co-polymers of a first monomer which is an LLC monomer having strong LLC character and a second monomer having either a weak or no LLC character. As used herein, a monomer having strong LLC character displays a single, well-defined LLC phase over a relatively broad range of temperatures, pressures, and/or composition conditions. A monomer having weak LLC character displays a mixture of LLC phases, or a single LLC phase under a narrow set of conditions. The first monomer having strong LLC character acts as a structure-directing agent for the second monomer, with the LLC phase formed by the co-polymer being the LLC phase formed by the structure-directing agent.

The first monomer is an LLC monomer. For formation of the $H_{II}$ phase, the LLC monomer is preferably a taper shaped-mesogen (i.e. having a small hydrophilic headgroup and a broad flattened hydrophobic tail section). Polymerizable LLCs have also been designed that spontaneously form the bicontinuous cubic (Q) LC phase. These mesogens include gemini surfactant monomers. Monomer 6 forms a bicontinuous cubic phase (Pindzola, B. A., Ph.D. Thesis (2001), University of California, Berkeley). A single tailed version of monomer 6 exhibits similar behavior but requires added cross-linker to form a cubic network upon photopolymerization (Pindzola, B. A.; Jin, J.; Gin, D. L. *J. Am. Chem. Soc.* 2003, 125(10), 2940-2949).

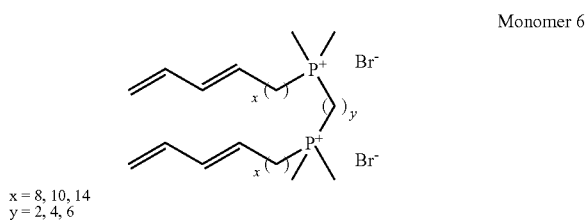

Monomer 6 x = 8, 10, 14
y = 2, 4, 6

The first monomer comprises an amphiphilic headgroup, a first polymerizable platform, and a first hydrogen bonding group (hydrogen-bonding linkage) between the headgroup and the polymerizable platform. The first monomer may be an amino-acid based monomer, in which case the amino acid can provide both the head group and part of the hydrogen bonding linkage. Monomer 2 is an L-alanine based amphiphile which is capable of acting as a structure directing agent to form the inverted hexagonal phase. In this monomer, the carboxyl group (—COOH) acts as the headgroup and the amide group (—$CONR_2$) acts as the hydrogen-bonding linkage. The D-alanine stereoisomer and racemic D and L alanine-based LLC mixtures also form the $H_{II}$ phase and may be used in the invention. Headgroups similar in size and molecular structure to the alanine head unit may also be used. Without wishing to be bound by any particular theory, it is believed that the substituent at the a position of the amino acid has an important effect on the mesogenic behavior of these LLC derivatives. The presence of an unsubstituted, flexible linker between the amide and the amino acid group was found to be detrimental to the formation of curved LLC phases, as was the presence of a bulky substituent at this location (such as a benzene group) (Zhou et al. (2003), Langmuir, 19, 6346).

Figure 3:
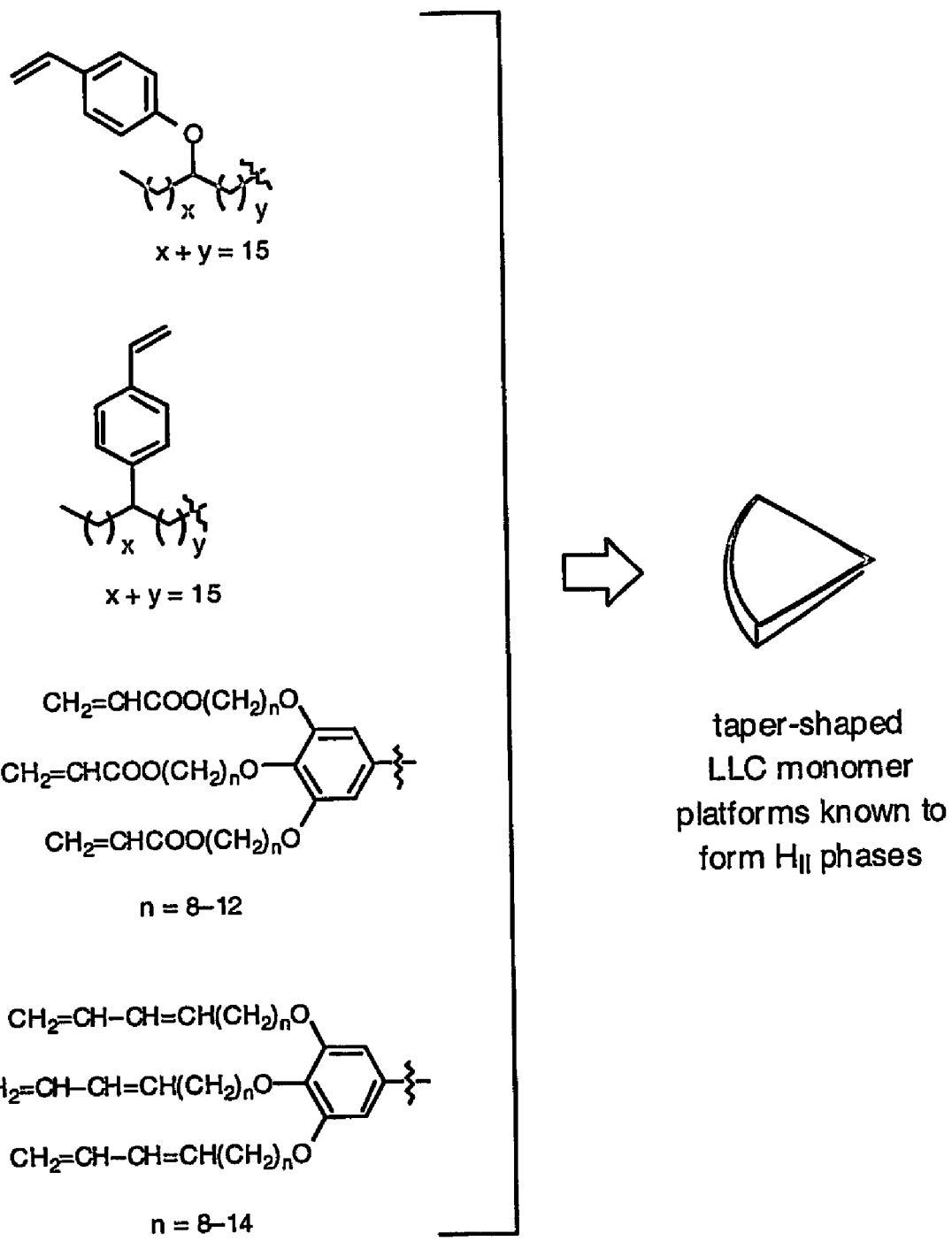
FIG. 3: Taper-shaped LLC monomer platforms known to form $H_{II}$ phases.

As used herein, the "platform" of a monomer having a hydrogen bonding linkage between the headgroup and the platform includes the hydrophobic tail group(s) of the monomer, and may include linking groups between the tail groups and the rest of the monomer. These linking groups may link the platform directly to the hydrogen-bonding linkage or additional spacer groups may be present. FIG. 3 illustrates several taper-shaped LLC monomer platforms known to form inverted hexagonal ($H_{II}$) phases.

Figure 4:
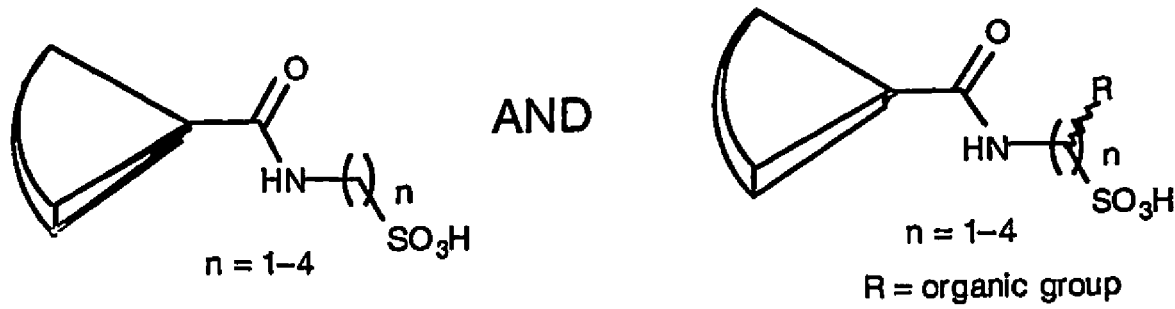
FIG. 4: Different spacer lengths and groups that may be present between the H-bonding linkage and the headgroup.

The hydrogen bonding linkage is located between the LLC platform and the head group. The hydrogen-bonding linkage comprises a hydrogen bonding group, or unit. Hydrogen bonding groups suitable for use with the invention allow covalent bonds to at least two organic units for use as a linkage between the LLC platforms and the desired headgroups. Preferably, the H-bonding unit also bridges or coordinates to at least 2 other H-bonding units to chain the order. Suitable H-bonding groups for either the first or second H-bonding linkage include amide groups, guanidine groups, carbamate groups, imine groups, and other H-bonding groups as would be known to a skilled artisan. The H-bonding linkages for the first and second monomer can be identical or different. Spacer groups may be present between the H-bonding linkage and the head group and the H-bonding linkage and the platform. However, the hydrogen bonding linkage should be sufficiently near the headgroup so that the hydrogen-bonding can enhance the LC assembly process and allow the structure directing monomer to direct the phase assembly behavior of the other monomer. FIG. 4 illustrates different spacer lengths and groups that may be present between the H-bonding linkage (illustrated as an amide group) and the headgroup (illustrated as (SO$_3$H) in FIG. 4).

The second monomer comprises a second headgroup comprising a functional group, a second polymerizable platform, and a second hydrogen-bonding group linking the second headgroup and the second polymerizable platform. The second headgroup need not be hydrophilic. The functional group can be selected from one or more of acidic groups, basic groups, catalytic groups, oxidizing agents, reducing agents, polymerization initiators, binding agents, optically active groups, and electrically active groups.

Acidic groups include Lewis acids and Brønsted acids. Brønsted acids are substances which serve as a proton donor to another substance which accepts a proton. Brønsted acids include, but are not limited to, sulfonic acid, phosphonic acid, phosphoric acid, sulfenic acid, sufinic acid, boronic acid, carboxylic acid, and weaker proton donor groups such as protonated ammonium or pyridinium groups.

Basic groups include, but are not limited to carboxylate groups, alkoxide groups, amide groups, and sulfide anions.

Catalytic groups include organic coupling catalysts, oxidation catalysts, reduction catalysts, polymerization catalysts, and hydrolysis catalysts. These catalysts may or may not be enantioselective (i.e. chiral) in nature. Monomer 7 (FIG. 2) is an example of a chiral Diels-Alder catalyst derivative. In an embodiment, the catalyst derivatives (i.e., monomers with catalytic headgroups) have headgroups approximately the same size as that of monomer 7. Oxidizing agents cause an atom, ion, or molecule to lose electrons. Reducing agents cause an atom, molecule or ion to gain electrons. Reducing agents suitable for use with the invention include, but are not limited to, Pd catalysts that catalyze reductions with $H_2$.

Polymerization initiators suitable for use with the invention include, but are not limited to, ring opening metathesis polymerization catalysts and living/controlled radical polymerization catalysts.

As used herein, a binding agent is a specific region (or atom) in a molecular entity that is capable of entering into a stabilizing interaction with another molecular entity. Binding agents include chemical agents which preferentially bond with specific molecules, atoms or ions, and so include molecular recognition sites and complexing agents. Binding agents include, but are not limited to, chiral binding agents, molecular receptors, biological receptors, and complexing agents for metal ions or gases. These chemical complexing agents may include, but are not limited to, metal ions such as $Cu^+$, $Cu^{2+}$, $Ag^+$, $Co^{2+}$, $Sc^{3+}$, and amine functionalities As used herein, optically active groups are chemical groups whose mirror image is not superimposable with itself. Optically active functional groups allow chemical reactions to be performed with chiral specificity.

As used herein, electrically active groups are chemical groups which are capable of responding to electrical energy or applied electrical fields. Electrically active groups suitable for use in the invention include any strongly polar organic groups and electrically conducting groups that are polyconjugated in nature. Electrically conducting groups that are polyconjugated in nature include, but are not limited to, polyphenylenes, poly thiophenes, polypyrroles, and other such compounds known to those skilled in the art.

The second polymerizable platform is sufficiently chemically similar to the first polymerizable platform so that the first monomer can act as a structure directing agent for the second monomer. The second polymerizable platform can be the same as the first polymerizable platform or can be different.

The cross-linked co-polymerized LLC polymer comprises nanopores. As used herein, "nanometer scale dimension" refers to dimensions between about 0.5 and about 2 nm and "nanopores" refers to pores having a diameter between about 0.5 and about 2 nm. As used herein, a "monodisperse" pore size has a variation in pore size of less than ca. 15% (specifically an ideally narrow Poisson distribution). The pore structure is substantially determined or controlled by the inverted hexagonal phase or bicontinuous cubic phase formed by the monomers. There is typically some contraction of the structure, approximately 5 vol %, on heavy cross-linking of the polymer into a network. A slight decrease in x-ray diffraction spacings can be seen in the $H_{II}$ phase after polymerization. The resulting cross-linked co-polymer may contain polydomains.

The pore and unit cell sizes of the nanoporous lyotropic LC assemblies may be tuned via modification of the structure directing LC monomer. It is believed that the size of pores and the LLC unit cells is dictated by the packing and shape of the constituent monomers (i.e., the LLC structure directing agent and the functionalized monomer). Different chemical structures and shapes will alter packing efficiency and LLC unit cell features. (Resel, R.; Leising, G.; Markart, P.; Kreichbaum, M.; Smith, R.; Gin, D., *Macromol. Chem. Phys.* 2000, 201 (11), 1128). In addition, different nanoporous architectures can be achieved via the use of lyotropic LC monomers that form different mesophases (Gin, D. L.; Gu, W.; Pindzola, B. A.; Zhou, W.-J., *Acc. Chem. Res.* 2001, 34, 973-980.)

The co-polymerized LLC polymer described above may be tuned or optimized for different reactions and conditions via avenues of chemical and structural control. The ability to tune the local nanoenvironment and nanostructure may be valuable in determining selectivity and the effectiveness of the functional group. As used herein, selectivity refers to the ratio of the desired reaction product to one or more side products. The materials of the invention can offer higher selectivities for a desired product, such as an ester product, over unwanted side products compared to currently available materials. In particular, the materials of the invention can possess selectivities with respect to a particular side product of greater than about 150 to 1, about 200 to 1, or about 300 to 1. The materials of the invention can also possess overall selectivities with respect to all other side products of greater than about 50 to 1, about 75 to 1, or about 100 to 1.

The materials of the invention can be produced in monolithic, powder, and thin film form, depending on the processing conditions (for example, the solvent, temperature, and system composition) prior to polymerization. Thin films of the materials of the invention can be prepared on a porous support, thereby producing a composite nanofiltration membrane. The nanostructured acid catalyst can be used in the same forms as current polymeric acid resins such as Amberlyst and Nafion in applications: powders, pellets, thin films, supported particles and films.

In the methods of the invention, the two monomers can be blended by combining appropriate amounts of the monomers, solvent, and a polymerization initiator and/or cross-linking agent and mixing until the mixture appears homogeneous. In an embodiment, the ratio of the solvent to the monomer is between about 1 wt % to about 15 wt %. Depending on the two monomers, the desired ratio of the structure directing monomer to the functionalized monomer may be greater than about 1:1. In other cases, the desired ratio may be in the range about 3:1-about 1:3 or about 5:1-about 1:5. The desired range may also include more extreme ratios. The monomers are preferably blended until the mixture appears substantially homogeneous. As used herein, a mixture is substantially homogenous when characterized by a lack of any crystalline regions, and the appearance of a blue hue in the polarized light microscopy (PLM) optical texture. The formation of the desired LLC phase is then determined unequivocally by X-ray diffraction. Appropriate solvents may be selected from the group consisting of water, polar organic solvents, and mixtures thereof. Polar organic solvents suitable for the present invention include, but are not limited to, N,N-dimethylformamide (DMF), acetonitrile, tetrahydrofuran, dimethylactamide, ethers, alcohols, and mixtures thereof.

If the polymerization initiator is a radical photoinitiator, the lyotropic LC phase can be photo-cross-linked by putting it under UV light in air or nitrogen at ambient temperature. Other temperatures as known by those skilled in the art may be used during the cross-linking process. Other methods of cross-linking as known to those skilled in the art may also be used. For example, thermal cross-linking may be performed using a cationic initiator as a cross-linking agent.

The solvent may be evaporated from the cross-linked LLC polymer by allowing the solvent to evaporate at ambient temperature. Other temperatures and controlled atmospheres as known by those skilled in the art can be used to evaporate the solvent.

For polydomain, cross-linked $H_{II}$ films, not all of the nanopores are necessarily open, aligned, and continuous throughout the film. The alignment of the nanopores is generally improved by decreasing the LC polymer film thickness. Additional alignment techniques known to those skilled in the art may also be employed, for example application of external forces (for example, shear forces), interactions with surfaces, and applications of large magnetic or electric fields. Films can be prepared on a porous support by a method comprising the steps of: providing a porous support, preparing a solution comprising the first and second monomers, an organic solvent for the monomer, and water, wherein the organic solvent is selected to be compatible with the support; applying a layer of the solution onto the porous support; evaporating the solvent from the solution; and cross-linking the first and second monomers. In an embodiment, the layer of solution is applied to the porous support by roller casting.

Those of ordinary skill in the art will appreciate that the lyotropic liquid crystal polymers of this invention can be prepared using starting materials other than those specifically disclosed herein and that procedures and techniques functionally equivalent to those described herein can be employed to make and assess the LLC polymers herein.

All references cited herein are incorporated by reference to the extent not inconsistent with the disclosure herein.

EXAMPLES

Example 1

Preparation of Compounds 1 and 2

Materials and General Procedures. Methyl gallate, 11-bromoundecanol, acryloyl chloride, 2-hydroxy-2-methyl propiophenone, L-alanine, β-alanine, L-phenylalanine, S-lactic acid, and 2-aminoethanesulfonic acid were obtained from the Aldrich Chemical Co. and used as purchased. Thionyl chloride (Aldrich) was distilled prior to use. Methylene chloride was vacuum-transferred from $CaH_2$ prior to use. THF (Fisher) was vacuum-transferred from sodium benzophenone ketyl and degassed via repeated freeze-pump-thaw cycles before use. All other chemicals and solvents were purchased from either Aldrich or Fisher Scientific and used without further purification unless otherwise indicated. Normal phase column chromatography was performed using 230-400 mesh silica gel purchased from EM science. C18-reverse phase silica gel (230-400 mesh) and C18-reverse phase nano-silica gel TLC plates were purchased from Fluka. Acidic ion-exchange resin AG 50W-X8 (100-200 mesh, hydrogen form) was purchased from Bio-Rad Laboratories. All manipulations (except for reaction work-up procedures) were performed under light $N_2$ or Ar flush using conventional Schlenk line techniques. Unless otherwise specified, organic extracts were dried over anhydrous $Na_2SO_4$. Solvents were removed using a rotary evaporator at aspirator pressure, followed by drying on a Schlenk line ($\leq 10^{-4}$ torr).

Instrumentation. $^1$H NMR spectra were obtained using a Bruker AMX-300 (300 MHz) spectrometer, or Varian Inova 500 (500 MHz) and Inova 400 (400 MHz) spectrometers. Chemical shifts are reported in ppm relative to residual non-deuterated solvent. Fourier transform infrared spectroscopy (FT-IR) measurements were performed using a Perkin-Elmer 1616 series spectrometer or a Nicolet Magna-IR 750 spectrometer, as thin films on Ge crystals. Powder X-ray diffraction (XRD) spectra were obtained with an Inel CPS 120 diffraction system using monochromated Cu $K_\alpha$ radiation. X-ray diffraction (XRD) measurements on samples were all performed at ambient temperature (21±1° C.). Polarized light microscopy (PLM) studies were performed with a Leica DMRXP polarizing light microscope equipped with an Optronics digital camera assembly. High-resolution mass spectral analysis was performed by the Microanalytical Facility at the University of California, Berkeley, Calif., or by the Central Analytical Facility in the Dept. of Chemistry and Biochemistry at the University of Colorado, Boulder. Elemental analyses were performed by either the Microanalytical Facility (University of California, Berkeley) or by Galbraith Laboratories, Knoxville, Tenn. The LLC mixtures were mixed using a IEC Centra-CL2 centrifuge. A Cole-Palmer 9815 series 6 watt UV (365 nm) lamp was used for photopolymerization. UV light fluxes at the sample surface were measured using a Spectroline DRC-100× digital radiometer equipped with a DIX-365 UV-A sensor.

3,4,5-Tris(11'-acryloyloxyundecyloxy)benzoic acid (3). This compound was prepared from methyl gallate, 11-bromoundecanol, and acryloyl chloride as described in the literature. Characterization data agreed with those reported in the literature. (Gray, D. H.; Gin, D. L. *Chem. Mater.* 1998, 10, 1827, Mueller, A.; O'Brien, D. F. *Chem. Rev.* 2002, 102, 727, Gin, D. L.; Gu, W.; Pindzola, B. A.; Zhou, W.-J. *Acc. Chem. Res.* 2001, 34, 973, O'Brien, D. F.; Armitage, B.; Benedicto, A.; Bennett, D. E.; Lamparski, H. G.; Lee, Y.-S.; Srisiri, W.; Sisson, T. M. *Acc. Chem. Res.* 1998, 31, 861, Ringsdorf, H.; Schlarb, B.; Venzmer, *J. Angew. Chem. Int Ed. Engl.* 1988, 27, 113.)

N-(3,4,5-Tris(11'-acryloyloxyundecyloxy)benzoyl)-L-alanine (2). Compound 3 (1.01 g, 1.20 mmol) was dissolved in dry $CH_2Cl_2$ (20 mL) under $N_2$ flush in a round-bottom flask. A trace amount of nitrobenzene was added as a radical polymerization inhibitor. The flask was placed in an ice-water bath for 20 min before $SOCl_2$ (0.44 mL, 6.0 mmol) was added dropwise using a syringe. The reaction was then warmed up to ambient temperature and stirred at that temperature for a total of 5 h. The solvent was removed in vacuo to give the resulting acid chloride of 3 as a light yellow liquid in near quantitative yield. This compound was then dissolved in acetone (12 mL) and added to a 25-mL Schlenk flask containing a mixture of L-alanine (0.43 g, 1.2 mmol), $K_2CO_3$ (1.0 g, 7.2 mmol), and water (2.5 mL) with vigorous stirring. The reaction mixture was vigorously stirred at ambient temperature until all the solids dissolved and then stirring was continued for an additional 10 h, after which time 1.5 N aqueous HCl (35 mL) was added. The reaction mixture was then extracted with EtOAc (30 mL) and the organic extracts dried over anhydrous $Na_2SO_4$. Filtration of the $Na_2SO_4$ and removal of the solvent afforded the crude product which was further purified by column chromatography using EtOAc/hexane/AcOH (300/200/6.5)(v/v/v) to give 2 as a white solid. Yield: 0.54 g (49%). $^1$H NMR (300 MHz, $CDCl_3$): δ 1.28-1.46 (br m, 42H), 1.60 (d, J=7.1 Hz, 3H), 1.61-1.85 (m, 12H), 4.00 (m, 6H), 4.13 (m, 6H), 4.75 (m, 1H), 5.81 (dd, J=10.4, 1.5 Hz, 3H), 6.12 (dd, J=17.3, 10.4 Hz, 3H), 6.40 (dd, J=10.4, 1.5 Hz, 3H), 6.64 (br m, 1H), 6.98 (s, 2H). $^{13}$C NMR (75 MHz, $CDCl_3$): δ 18.06, 25.80, 25.83, 25.93, 28.47, 29.14, 19.18, 29.24, 29.39, 29.45, 29.55, 30.17, 48.66, 64.68, 69.19, 73.36, 105.75, 128.21, 128.46, 130.50, 141.36, 152.97, 166.35, 166.39, 167.38, 175.81. IR (neat): 3354 (sharp), 2919, 2847, 1725, 1631, 1613, 1578, 984, 808 $cm^{-1}$. HRMS Calcd for $C_{52}H_{84}NO_{12}$ $(M+H)^+$: 914.59962. Found: 914.59814. Anal. calcd for $C_{52}H_{83}NO_{12}$: C, 68.32; H, 9.15; N, 1.53. Found: C, 68.06; H, 9.07; N, 1.50.

Compound 1. Compound 3 (1.09 g, 1.30 mmol) was dissolved in anhydrous $CH_2Cl_2$ (25 mL) in a 50-mL Schlenk flask under argon. Thionyl chloride (0.57 mL, 7.8 mmol) was then added via syringe to the stirred solution. After 12 h, the solvent was removed under reduced pressure to afford a yellow oil, which was then dissolved in acetone (20 mL). A solution of 2-aminoethanesulfonic acid (0.81 g, 7.8 mmol) and $K_2CO_3$ (0.89 g, 7.8 mmol) dissolved in a mixture of 1:1 water/acetone (5 mL) was subsequently added to the stirred solution of acid chloride. After 12 h, purification of the crude mixture using reversed phase column chromatography (methanol:water=1:1 to 9:1 v/v) afforded the potassium salt of 1. This salt was then acidified by passing the solution through a column packed with acidic ion-exchange resin (AG 50W-X8). After further rinsing the resin with methanol, the solvent was removed in vacuo to afford the pure sulfonic acid monomer 1 as a pale yellow solid.

Yield: 0.95 g (76%) $^1$H NMR (500 MHz, $d_6$-DMSO): δ 1.27 (br m, 36H), 1.43 (m, 6H), 1.57 (m, 8H), 1.74 (m, 4H), 2.64 (t, 2H), 3.51 (t, 2H), 3.87 (t, 2H), 3.96 (t, 6H), 4.08 (t, 6H), 5.92 (dd, 3H), 6.15 (dd, 3H), 6.32 (d, 3H), 7.07 (s, 2H), 8.43 (s, 1H). $^{13}$C NMR (100 MHz, $d_6$-DMSO): δ 26.07, 26.32, 28.77, 29.37, 29.48, 29.67, 29.85, 29.75, 29.85, 30.48, 36.76, 51.10, 64.70, 68.98, 73.36, 94.63, 105.97, 129.04, 131.90, 142.75, 152.88, 166.12, 175.81. LRMS for $C_{51}H_{83}NO_{13}S$: 950.27. Found: 950.30. Anal. calcd for $C_{51}H_{83}NO_{13}S$: C, 64.46; H, 8.80; N, 1.47; S, 3.37. Anal. calcd for $C_{51}H_{83}NO_{13}S \cdot 3H_2O$: C, 60.99; H, 8.93; N, 1.39; S, 3.19. Found: C, 61.31; H, 9.05; N, 1.35; S, 3.18; K, 851 ppm.

Example 2

Preparation of an LLC Mixture of Compound 1 and Compound 2

General procedure for preparation of LLC mixtures. LLC mixtures were prepared as follows: Appropriate amounts of the amphiphile(s) and DMF or water based on weight were combined in a small test tube and mixed with a spatula until the mixture was homogeneous to the eye. After wrapping in Parafilm™, the tube was immersed in a hot water bath (~100° C.) for 10 s to melt and thermally mix the samples. Hand-mixing with a spatula was continued for another 2 minutes, followed by a centrifugation at 3800 rpm for 15 min. The sample tube was sealed with Parafilm™ during centrifugation to prevent evaporative loss of the solvent. This procedure was repeated three times, or until the mixture appeared homogeneous under the PLM. Homogeneous mixing was characterized by a lack of any crystalline regions, and the appearance of a blue hue in the PLM optical texture. The birefringent mixtures were then analyzed by XRD to confirm the nature of the LLC phases.

General procedure for photopolymerization of the LLC mixtures. The LLC mixtures were prepared as described above, but with 1 wt % 2-hydroxy-2-methylpropiophenone added as radical photo-initiator. The pasty LLC samples were then spread onto glass slides or Al sample pans and irradiated with 365 nm UV light (ca. 3.5 mW/cm$^2$) overnight. Retention of phase architecture in the samples was checked by XRD before and after photopolymerization. The degree of acrylate conversion was determined by monitoring the loss of the acrylate IR bands. (Gray, D. H.; Gin, D. L. *Chem. Mater.* 1998, 10, 1827, Mueller, A.; O'Brien, D. F. *Chem. Rev.* 2002, 102, 727, Gin, D. L.; Gu, W.; Pindzola, B. A.; Zhou, W.-J. *Acc. Chem. Res.* 2001, 34, 973, O'Brien, D. F.; Armitage, B.; Benedicto, A.; Bennett, D. E.; Lamparski, H. G.; Lee, Y.-S.; Srisiri, W.; Sisson, T. M. *Acc. Chem. Res.* 1998, 31, 861, Ringsdorf, H.; Schlarb, B.; Venzmer, J. *Angew. Chem. Int Ed. Engl.* 1988, 27, 113.)

Characterization of Mixtures of 1 and 2.

Figure 5A:
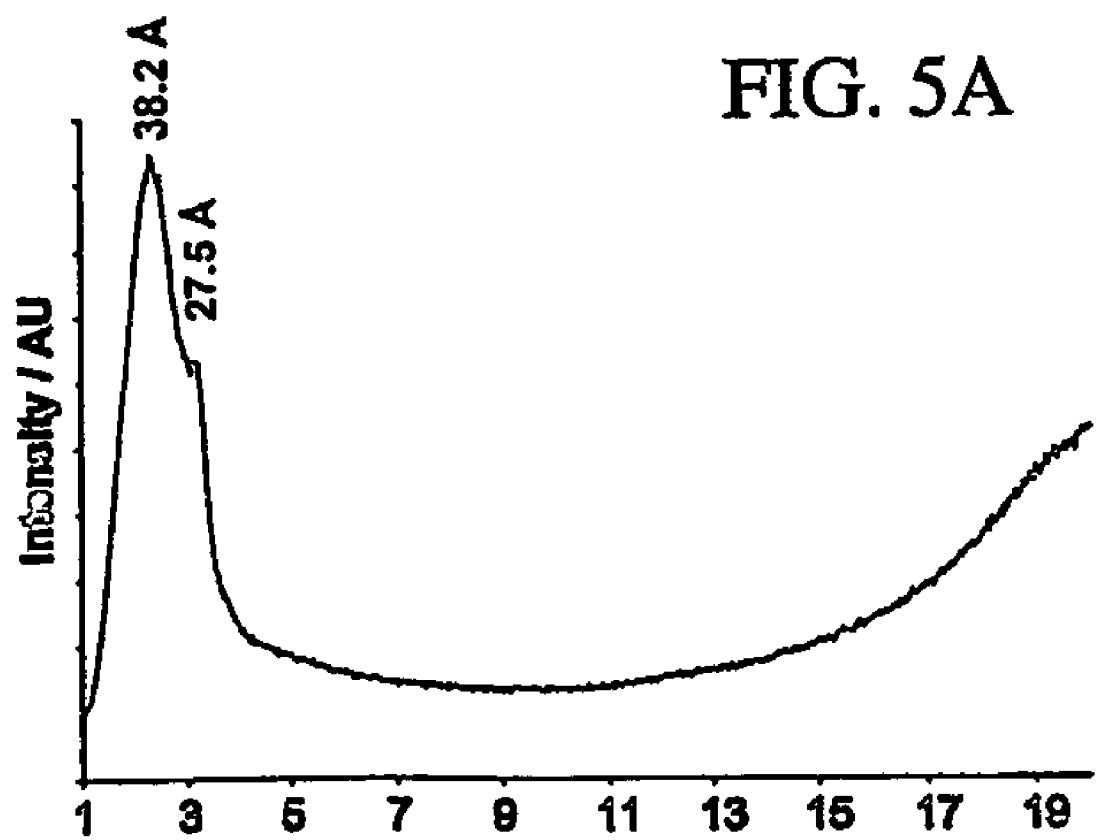
FIG. 5a: XRD Profile of a mixed LLC phase of monomer 1 containing 6 wt % $H_2O$.
Figure 5B:
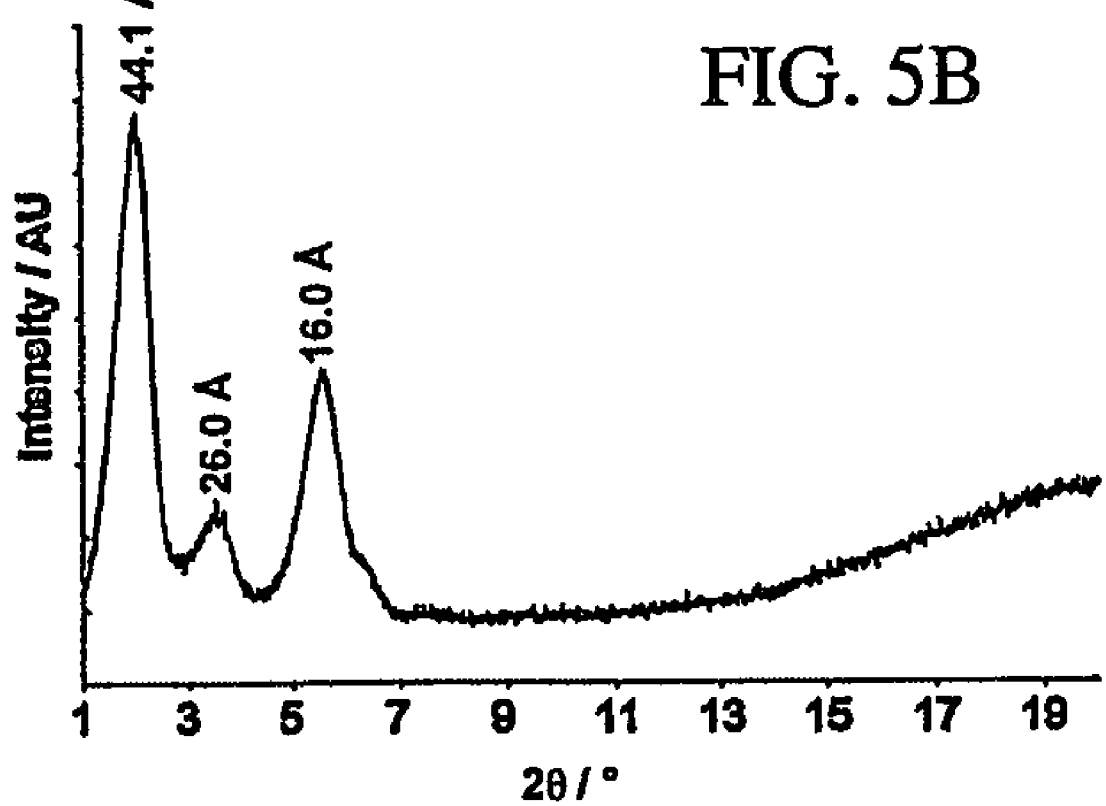
FIG. 5b: XRD Profile of a 1:1 (mol/mol) mixture of monomer 1 and monomer 2 containing 6 wt % $H_2O$.

XRD analysis revealed that 1 forms a mixture of L and $H_{II}$ phases in the presence of water (FIG. 5a), even though 1 possesses a distinct taper shape. FIG. 5a shows the XRD profile of a mixed LLC phase of 1 containing 6 wt % $H_2O$ at 21+/−1° C. Without wishing to be bound by any particular theory, the presence of an unsubstituted, flexible ethyl tether may be detrimental to formation of a well-defined $H_{II}$ phase. By using 2 as structure-directing agent, it was found that mixtures of 2 and 1 afford $H_{II}$ phases that can be photo-cross-linked with retention of phase microstructure (FIG. 5b). FIG. 5b shows results for a 1:1 (mol/mol) mixture of 1 and 2 containing 6 wt % $H_2O$ at 21+/−1° C. Mixtures of 1 and 2 as high as 5:1 and as low as 1:5 (mol/mol) were found to form $H_{II}$ assemblies in water. Table 1 shows XRD peak listings of cross-linked $H_{II}$ phases of various mixtures of monomers 1 and 2. The pore diameter of mixture of 1 and 2 was between about 1.2 and about 1.5 nm.

Figure 6:
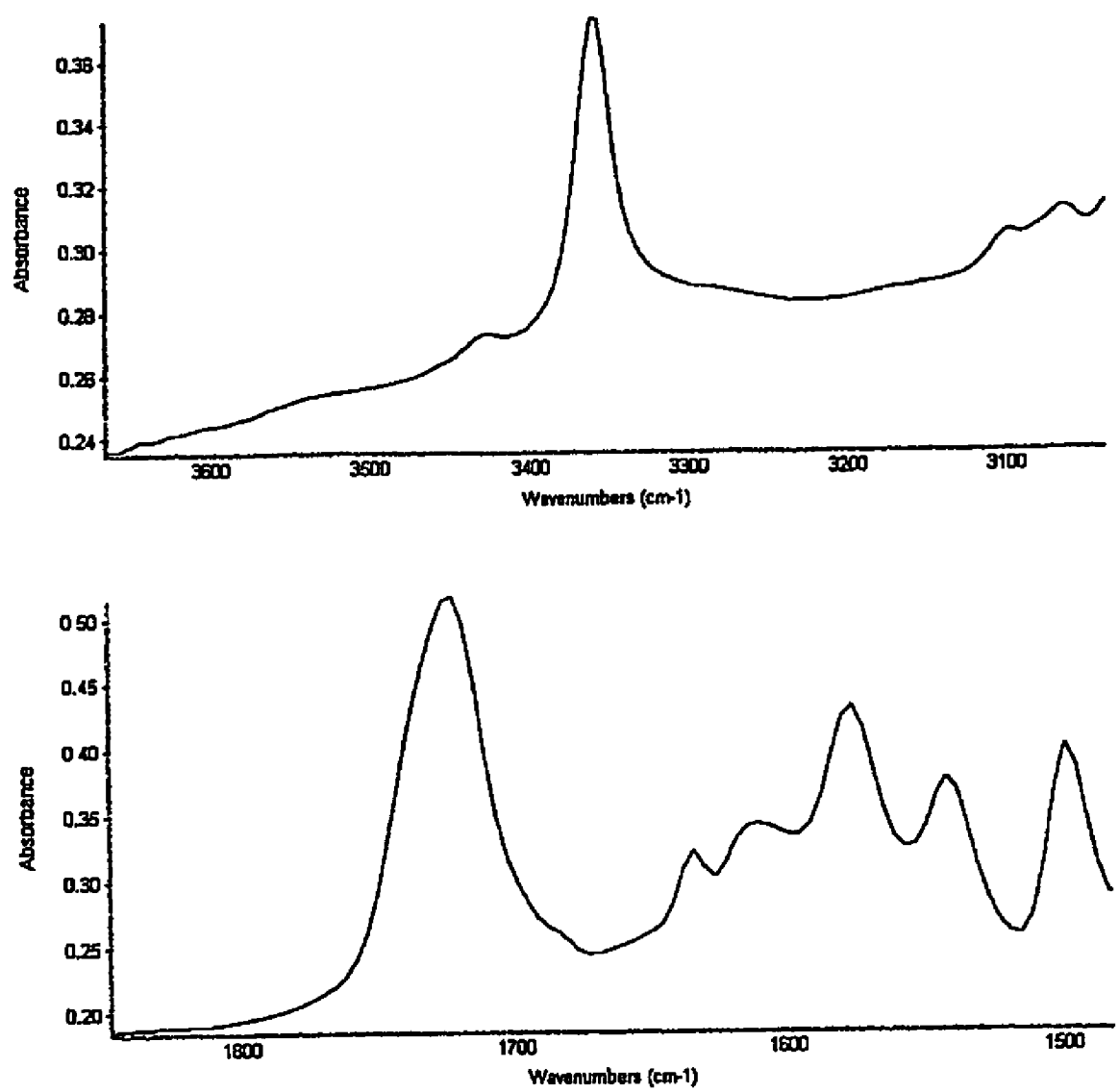
FIG. 6: Representative partial IR spectra of a 1:1 (mol/mol) mixture of monomer 1 and monomer 2 in the $H_{II}$ phase containing 6 wt % $H_2O$.

As shown in FIG. 6, FT-IR analysis revealed the presence of amide H-bonding in the mixtures (vN—H=3360 $cm^{-1}$). FIG. 6 is a representative partial IR spectra of a 1:1 (mol/mol) mixture of 1 and 2 containing 6 wt % $H_2O$. The position of this IR band does not change appreciably with changes in the ratio of the two monomers. The cross-linked $H_{II}$ mixtures of 1 and 2 retain the strong acidity introduced by the $SO_3H$ groups, as determined by titration. For example, approximately 80% of the total number of $SO_3H$ sites in a powdered sample of polymerized $H_{II}$ mixture of 1 and 2 (1:5 mol/mol) can be accessed and neutralized by aqueous NaOH solution.

TABLE 1

| Mole Ratio of Monomer 1:monomer 2 | XRD Peak Positions (Å) | | | |
|---|---|---|---|---|
| | 1 | 1/√3 | 1/√4 | 1/√7 |
| 5:1 | 42.2 | 24.2 | — | 15.8 |
| 3:1 | 41.9 | 24.0 | — | 15.6 |
| 1:1 | 42.2 | 24.5 | — | 16.0 |
| 1:3 | 41.8 | 24.1 | — | 15.8 |
| 1:5 | 42.3 | 24.2 | — | 16.0 |

Example 3

Catalysis Results for LLC Mixture of Compound 1 and Compound 2

Figure 7:
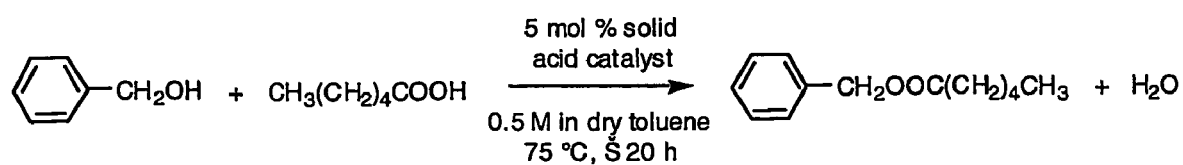
FIG. 7: Esterification of benzyl alcohol with 1-hexanoic acid in dry toluene.
Figure 8:
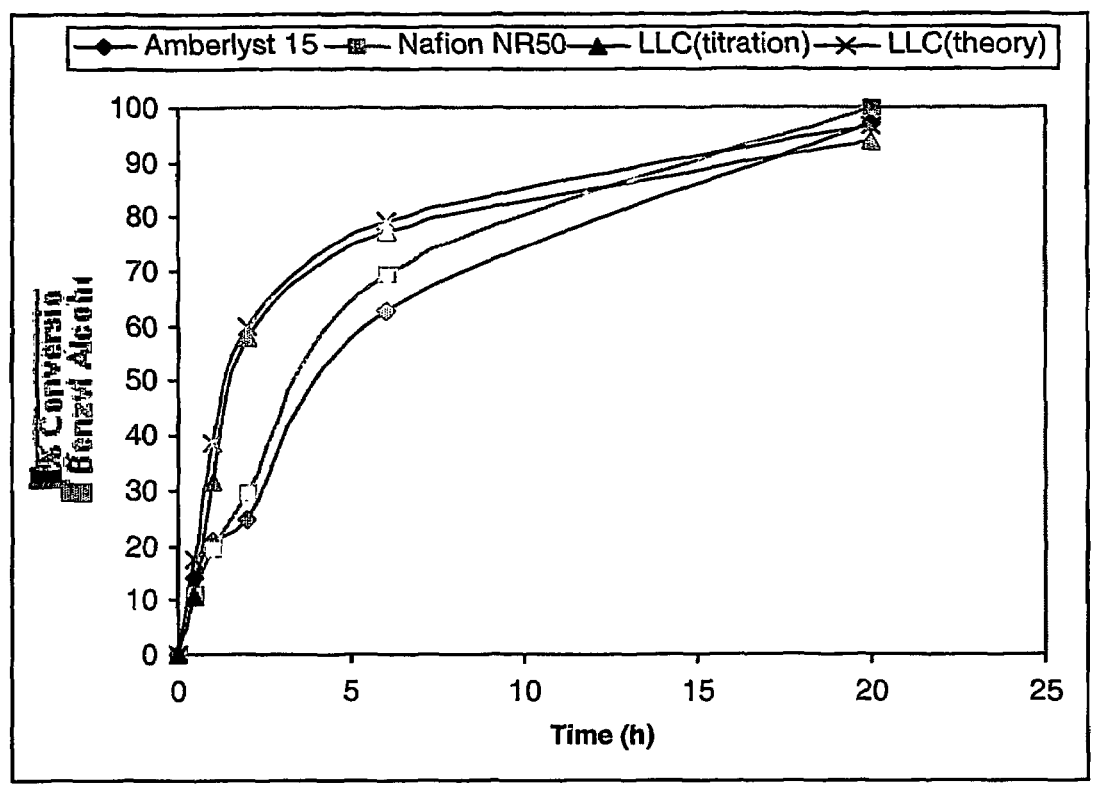
FIG. 8: Percent conversion of benzyl alcohol as a function of time for a 5:1 (mol/mol) mixture of monomer 1 and monomer 2 containing 6 wt % $H_2O$ as compared to two commercially available solid acid catalysts.
Figure 9:
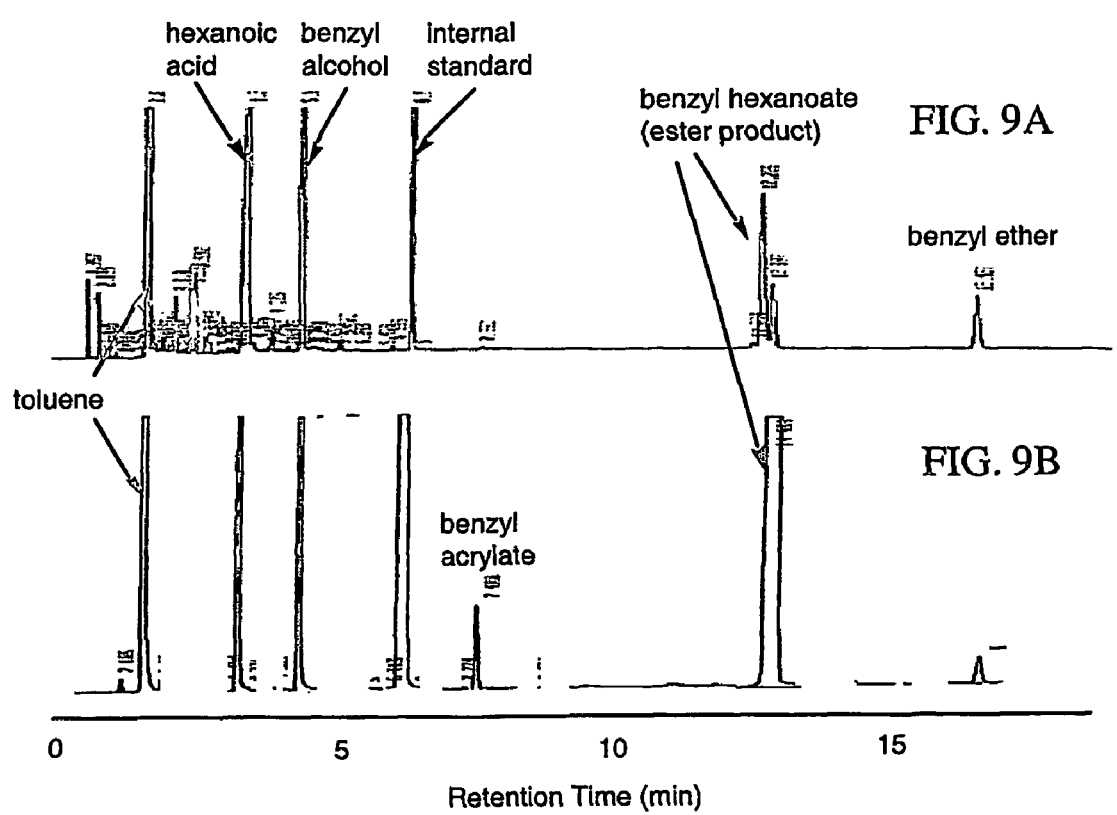
FIG. 9A: Representative gas chromatograph of the product mixture from an esterification reaction using Amberlyst™-15 catalyst.
FIG. 9B: Representative gas chromatograph of the product mixture from an esterification reaction for a 5:1 (mol/mol) mixture of monomer 1 and monomer 2 containing 6 wt % $H_2O$.
Figure 10:
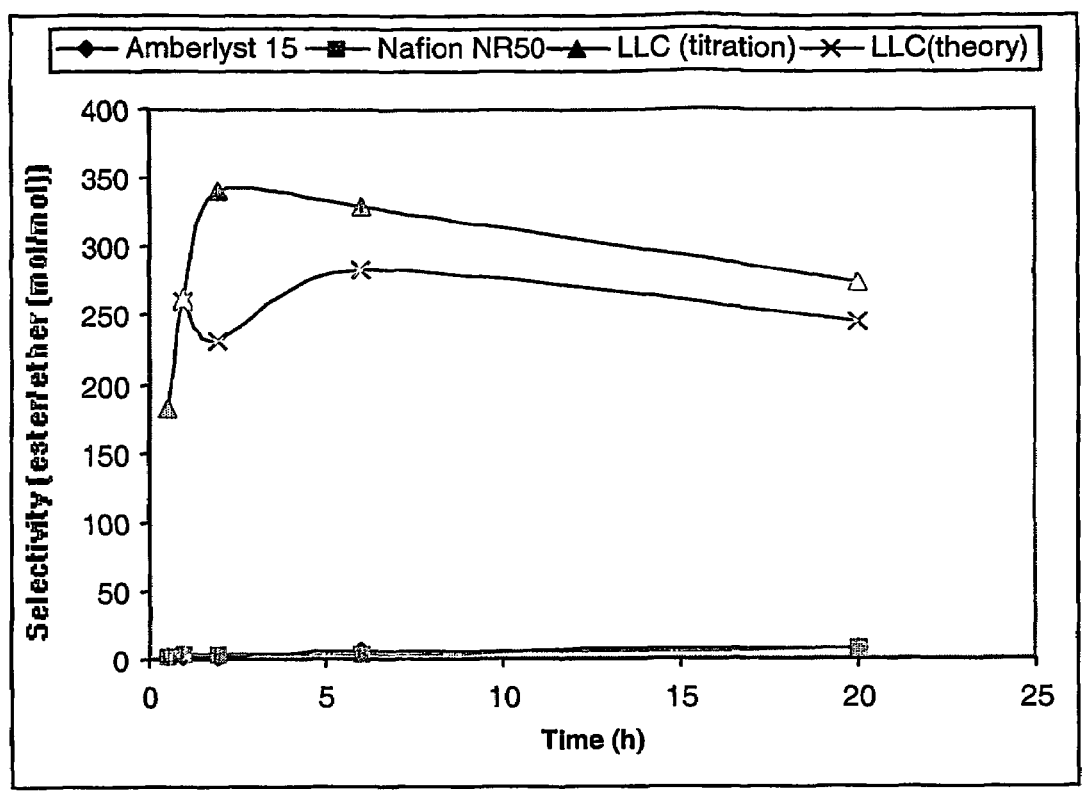
FIG. 10: Selectivity (desired product/side product) as a function of time for a 5:1 (mol/mol) mixture of monomer 1 and monomer 2 containing 6 wt % $H_2O$ compared to two commercial solid acid catalysts.
Figure 11:
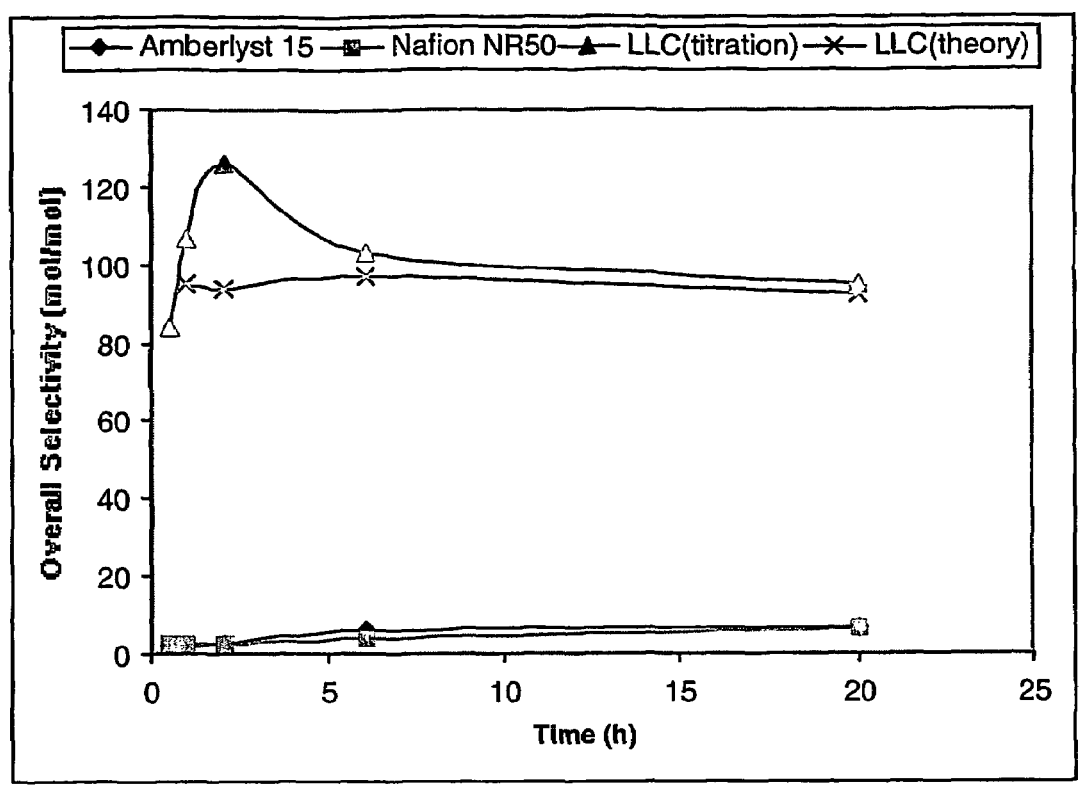
FIG. 11: Overall selectivity as a function of time for a 5:1 (mol/mol) mixture of monomer 1 and monomer 2 containing 6 wt % $H_2O$ compared to two commercial solid acid catalysts.

Heterogeneous acid catalysis experiments were performed using the esterification of benzyl alcohol with 1-hexanoic acid in dry toluene as a test platform (FIG. 7). We demonstrated that the nanostructured LC acid resin (5:1 (mol/mol) 1:2 in powdered form)(prepared as described in Example 2) has slightly higher reactivity than commercial Amberlyst™-15 (Rohm Haas) and Nafion® NR50 (DuPont) of approximately the same particle size at a loading level of 5 mol % acid sites (FIG. 8). More importantly, it was found that the nanostructured acid resin exhibits much higher selectivity for the desired ester product over unwanted side products such as dibenzyl ether. FIGS. 9A and 9B show representative gas chromatographs of the product mixture from an esterification reactions using Amberlyst™-15 (9A) and the nanostructured LC acid resin (9B), respectively. The products were identified by GC-MS. As can be seen in the plots in FIG. 10, the ratio of the desired ester product produced compared to dibenzyl ether side product is greater than 300 to 1 for the nanostructured acid resin. In contrast, Amberlyst™-15 and Nafion® NR50 only afford selectivity ratios of 6 to 1 for the ester compared to the ether. Similarly, the overall selectivity for the desired ester product over all other side products is greater than 100 to 1 for the LC acid resin, whereas Amberlyst™-15 and Nafion® NR50 show selectivities of less than 10 to 1 under the same conditions (FIG. 11).

This increase in selectivity is attributed to the more uniform solid acid environment presented by the nanoporous LC acid resin. Amberlyst™ and Nafion® resins are amorphous resins that are known to contain a distribution of micropore sizes, leading to a range of local acid environments and different possible reaction pathways as a function of local acidity (Sharma, M. M. "Some Novel Aspects of Cationic Ion-exchange Resins as Catalysts," *React. Funct. Polym.* 1995, 26, 3-23. Harmer, M. A.; Sun, Q. "Solid Acid Catalysis Using Ion-exchange Resins," *Appl. Catal. A* 2001, 221, 45-62.). There may also be differences in overall acidity between the nanostructured and non-nanostructured resins.

All these comparison tests were run with the amount of acid resin set at 5 mol % based on (1) the number of theoretical $SO_3H$ sites from total sample weight, and (2) the number of accessible $SO_3H$ sites based on NaOH titration of the acid resin. For the LC acid resin, the number of accessible acid sites was approximately 80% of the number of theoretical acid sites based on sample weight. Control experiments were also run in the absence of any added acid catalyst and with the pure cross-linked sulfonic monomer 1 and pure weak acid monomer 2. The esterification reaction does not proceed to any appreciable extent under the same reaction conditions in the absence of added acid catalyst, nor when 5 mol % of the pure cross-linked weak acid monomer 2 is added. This demonstrates that the presence of strong acid groups ($SO_3H$) is required for the acid catalysis and that the weakly acidic COOH groups of 2 do not contribute to the reactivity. It was also observed that the pure cross-linked $SO_3H$ LC monomer, which exists as a mixture of lyotropic LC phases on its own, affords different product selectivity compared to the 5:1 mixture of cross-linked 1 and 2 in the $H_{II}$ phase. Thus, catalyst nanostructure is an important factor in determining product selectivity.

Example 4

Preparation of LLC Mixtures of Compound 2 with Other Amino Acid Derivatives of 3

N-(3,4,5-Tris(11'-acryloyloxyundecyloxy)benzoyl)-β-alanine (4). Compound 4 was prepared from 3 as described above for compound 2, except β alanine was used instead of L-alanine. Yield: 53%. 1H NMR (300 MHz, $CDCl_3$): δ 1.23-1.45 (br m, 42H), 1.61-1.84 (m, 12H), 2.71 (t, J=5.7 Hz, 2H), 3.71(t, J=5.7 Hz, 2H), 3.97 (m, 6H), 4.13 (m, 6H), 5.81(dd, J=10.4, 1.5 Hz, 3H), 6.11 (dd, J=17.3, 10.4 Hz, 3H), 6.39 (dd, J=10.4, 1.5 Hz, 3H), 6.74 (br m, 1H), 6.95 (s, 2H). $^{13}C$ NMR (75 MHz, $CDCl_3$): δ25.8, 25.9, 28.5, 29.1, 29.2, 29.4, 29.5, 30.2, 33.6 (37.5), 35.4 (39.0), 64.6, 69.1, 73.3, 105.6, 128.5, 128.8, 130.5, 141.1, 152.9, 166.4, 167.7, 176.0. IR (neat): 3267 (brd), 2920, 2851, 1724, 1625, 1578, 984, 809 $cm^{-1}$. HRMS Calcd for $C_{52}H_{84}NO_{12}(M+H)^+$: 914.59962. Found: 914.59901. Anal. calcd for $C_{52}H_{83}NO_{12}$: C, 68.32; H, 9.15; N, 1.53. Found: C, 68.16; H, 9.17; N, 1.51.

N-(3,4,5-Tris(11'-acryloyloxyundecyloxy)benzoyl)-L-phenylalanine (5). Compound 5 was prepared from 3 using the same general procedure as described above for 2 but with L-phenylalanine in place of L-alanine. The only differences were that the acetone solution of the acid chloride of 3 was added to a mixture of L-phenylalanine (1.14 g, 6.90 mmol) with slightly different amounts of $K_2CO_3$ (1.27 g, 9.20 mmol), and water (10 mL). In addition, a mixture of 50/50/0.5 (v/v/v) EtOAc/hexanes/AcOH as the eluent for the column chromatography of the crude product, and the AcOH was removed by precipitating out the crude product in hexanes and decanting the supernatant. Yield: 0.48 g (40%). $^1H$ NMR (500 MHz, $CDCl_3$): 1.29-1.81 (br m, 60H), 3.25-3.40 (m, 2H), 3.93-3.98 (m, 6H), 4.13-4.17 (m, 6H), 4.97-5.03 (q, 1H), 5.80-5.84 (dd, 3H), 6.09-6.16 (dd, 3H), 6.38-6.43 (dd, 3H), 6.83 (s, 2H), 7.22-7.32 (m, 5H). $^{13}C$ NMR (100 MHz, $CDCl_3$): δ 26.16, 26.21, 26.26, 28.85, 29.51, 29.58, 29.75, 29.82, 29.93, 30.53, 37.29, 54.00, 65.01, 65.06, 69.50, 73.75, 76.97, 77.29, 77.61, 105.97, 127.61, 128.48, 128.86, 129.01, 129.76, 130.80, 130.87, 136.05, 153.36, 166.77, 168.12, 174.01. IR (neat): 3271 (brd), 2916, 2850, 2398, 2354, 1739, 1652, 1538, 1193, 1124, 1061, 985, 810 $cm^{-1}$. HRMS Calcd for $C_{58}H_{87}NO_{12}$: 989.62289, $(M+H)^+$: 990.6307. Found: 989.6197 and 990.6317.

XRD and FT-IR analysis of the β-alanine and L-phenylalanine derivatives (4 and 5) show amide H-bond-assisted aggregation behavior; however, 4 tends to form a L phase in neat form and with added DMF, whereas 5 is polycrystalline in nature and does not form a good LLC phase at all.

Mixtures of compound 2 with compound 4 and of compound 2 with compound 5 were prepared according to the general procedure described in Example 2.

Although 4 and 5 cannot form $H_{II}$ phases on their own, it was found that well-defined $H_{II}$ mixtures can be obtained when these compounds are blended with monomer 2. For example, the XRD profile of a 1:1 mol/mol mixture of 2 and 5 containing 12 wt % DMF clearly shows a $H_{II}$ phase XRD pattern. Mixtures of 2 and 5 with mole ratios as high as 3:1 and as low as 1:3 were found to form $H_{II}$ phases, although mixtures with ratios of 2 to 5 lower than 1:1 (mol/mol) show poorer $H_{II}$ phase definition by XRD. IR analysis of the $H_{II}$ mixtures shows a prominent N—H stretching band at ca. 3361 $cm^{-1}$, indicating the presence of somewhat slightly weaker amide H-bonding in the mixtures. ((a) Gordon, A. J.; Ford, R. A. *The Chemist's Companion*; Wiley-Interscience: New York, 1972; p. 200. (b) Williams, D. H.; Fleming, I. *Spectroscopic Methods in Organic Chemistry, 5th ed.*; MacGraw-Hill: London, 1995; p. 49. An H-bonded amide I band (ca. 1640 cm$^{-1}$) from the C=O moiety can sometimes be observed in amide-containing amphiphiles and used to infer the type of H-bonding environment and aggregation state. See: Shimizu, S.; E I Seoud, O. A. Langmuir, 2003, 19, 238. Unfortunately, the amide I band cannot be discerned in the IR spectra of our polymerizable amphiphiles because of an overlapping acrylate C=C stretching band in the same region.). Without wishing to be bound by any particular theory, amide H-bonding interactions between appear to allow amphiphiles with a strong preference to form certain LLC phases to "direct" the phase formation of poorer mesogens.

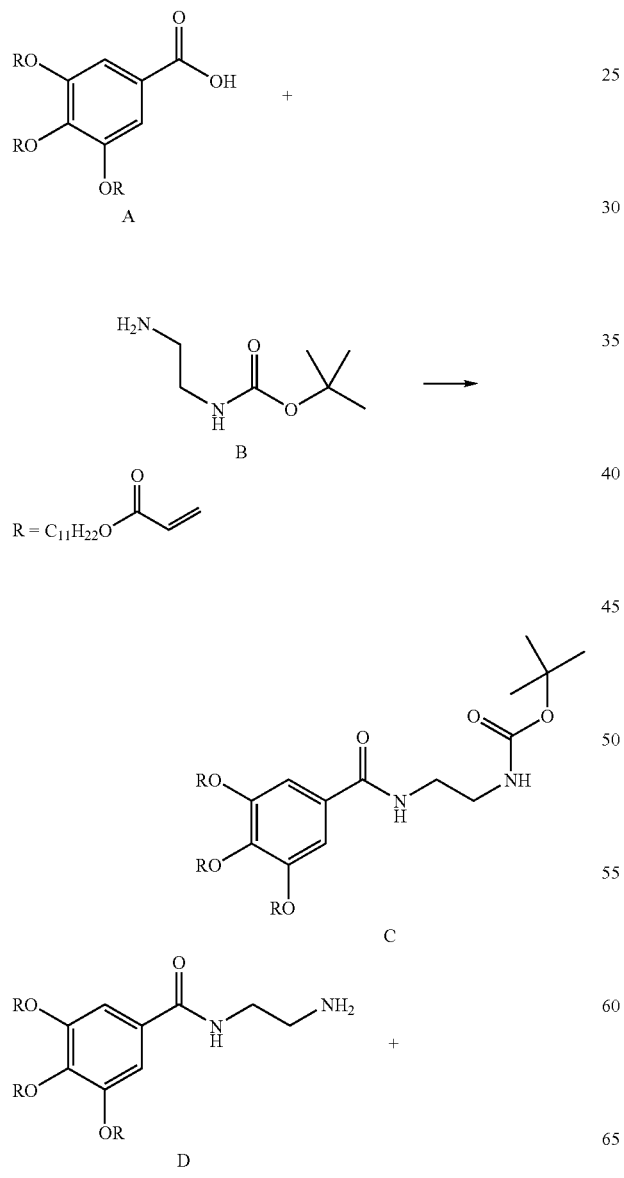

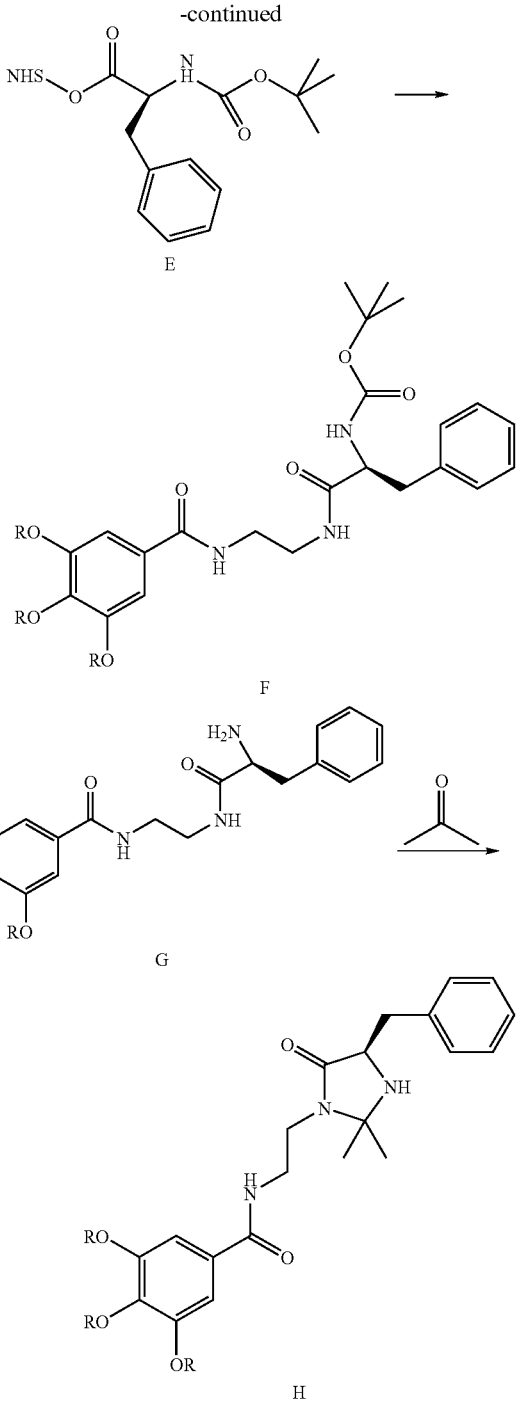

Example 5

Preparation of Compound 7

Figure 12:
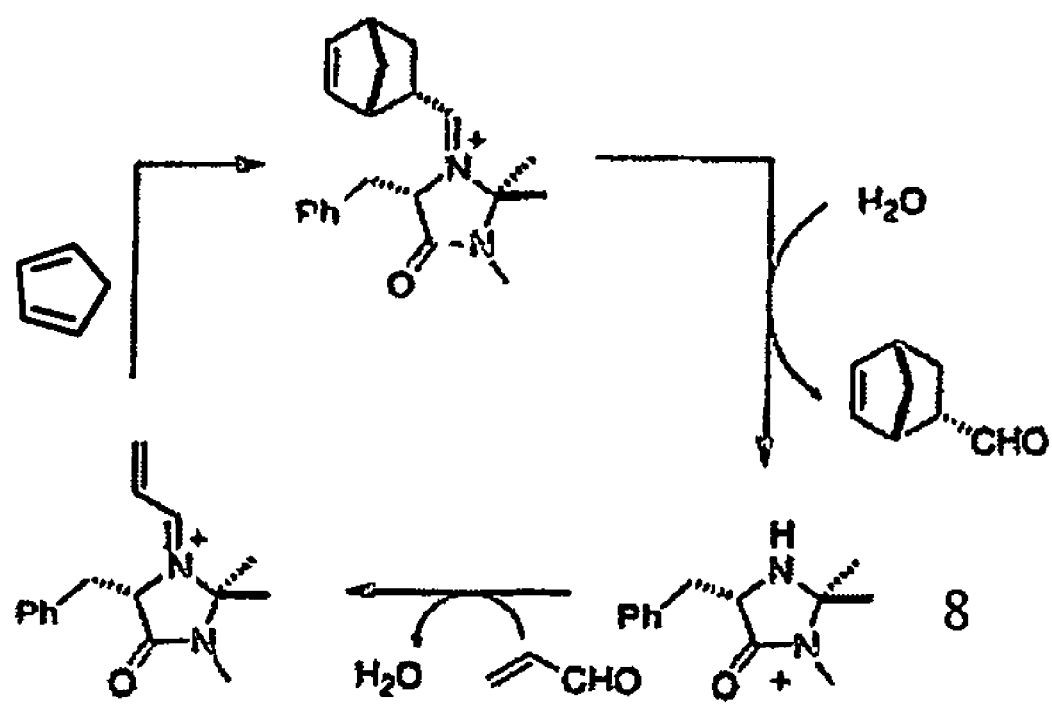
FIG. 12: Structure and mechanism of soluble, enantioselective Diels-Alder Organocatalyst™.

A polymerizable LLC analog of soluble catalyst 8 (i.e., monomer 7) was synthesized. FIG. 12 shows the structure and mechanism of this catalyst. The soluble Diels-Alder Organocatalyst™ (8) is known to catalyze the [4+2] thermal cycloaddition of dienes such as cyclopentadiene and dienophiles such as acrolein with high enantioselectivity. (Northrup, A.; MacMillan, D.," *J. Am. Chem. Soc.* 2002, 11, 2458). This reaction is typically performed in polar or hydrophilic solvents under mild conditions (Northrup, A.; MacMillan, D.," *J. Am. Chem. Soc.* 2002, 11, 2458).

Scheme 1 shows the formation of compounds C, F and H.

Compound B: Prepared according to literature prodecure. See Mono-protected diamines. N-tert-butoxycarbonyl-α,ω-alkanediamines from α,ω-alkanediamines. Krapcho, A. Paul; Kuell, Christopher S. Dep. Chem., Univ. Vermont, Burlington, Vt., USA. Synthetic Communications (1990), 20(16), 2559-64.

Compound C: Compound A (12.3 g, 14.6 mmol) was added to a dry Schlenk flask under argon. This was followed by the addition of DMAP (179 mg, 1.46 mmol). Compound B (2.8 g, 17.5 mmol) was first dissolved in a small amount of dry $CH_2Cl_2$ and then also added to the flask via a syringe. A small amount of BHT (~10 mg) was added as a radical inhibitor. Dry $CH_2Cl_2$ (100 mL) was added via a canula and the mixture was put on ice for 30 min. Finally, DCC (3.4 g, 16.1 mmol) was added and the reaction was left to warm to room temperature and stir overnight. Then the flask was placed in the freezer for two hours, after which the solution was vacuum filtered to remove the DCU. The supernatant was placed back in the freezer and the cycle repeated until no more DCU could be seen. The resulted solution was columned on silica (1:1 hexanes:ethyl acetate) and the fractions concentrated giving a gel-like solid (9.4 g, 65% yield).

Compound D: Compound C was dissolved in a 1:1 mixture of TFA:$CH_2Cl_2$ (20 mL) and left to stir for an hour, or until the -boc group was judged to be removed by TLC. Neutralization with sat. $NaHCO_3$ yielded quantitatively a white precipitate which was washed with copious amounts of water, and then left to dry for several days under vacuum.

NMR data found to be in agreement with the structure

HRMS (M+) for free amine: calc: 884.6216 found: 884.6136.

Compound E: Prepared according to literature procedure. See The Use of Esters of N-Hydroxysuccinimide in Peptide Synthesis. Anderson, George W.; Zimmerman, Joan E.; Callahan, Francis M. Journal of the American Chemical Society (1964), 86(9), 1839-42.

Compound F: Compound D (9.0 g, 10 mmol) and Compound E (5.0 g, 14 mmol) were added to a dry 100 ml Schlenk flask under argon. A small amount of BHT was added as a radical inhibitor. Anhydrous DMF (50 mL) was added via a syringe and the reaction was left to stir under a condenser at 60° C. overnight. An aqueous work-up, extraction with ethyl acetate, and drying with $MgSO_4$ resulted in a clear solution. The solvent was mostly evaporated, but dryness was avoided because of problems with polymerization. The concentrated solution was then columned on silica (1:9 hexanes:ethyl acetate), the fractions collected and evaporated to near dryness again.

Compound G: TFA and $CH_2Cl_2$ (1:1, 40 ml) were added to Compound F and left to stir for 1 hr or until the deprotection was judged complete by TLC. Neutralization was with sat. $NaHCO_3$ and the aqueous solution was extracted with ethyl acetate, dried with $MgSO_4$ and rotovaped to near dryness.

NMR data was found to be in agreement with the structure. Since this product readily polymerized in the solid state, full characterization of this intermediate has not been done.

Compound H: Compound G (~12 g, 11 mmol), acetone (20 g, 340 mmol), and p-toluenesulfonic acid (70 mg, 0.3 mmol) were all added to a 500 mL flask. A small amount of BHT was added as a radical inhibitor. Methanol (250 mL) was added and the solution was refluxed overnight. An aqueous workup, extraction with ethyl acetate, and drying with $MgSO_4$ yielded a pale yellow solution. The solvent was evaporated to near dryness, and the resulting yellow oil was columned over silica (100% ethyl acetate). The fractions were concentrated, resulting in a pale yellow oil.

Compound 7: Compound H was dissolved in a sat. HCL/ether solution. After stirring for five minutes, the solvent was removed under high vacuum for 24 hrs, and a pale yellow waxy solid remained. Yield: 3.5 g (27% over the last 3 steps)

NMR data found to be in agreement with the structure.

HRMS (M+H) for free amine: calc: 1072.7201 found: 1072.7244.

Monomer 7 did not display any amphiphilic or mesogenic behavior whatsoever. In its neutral form, 7 was found to be a viscous liquid at ambient temperature. As the catalytically active HCl salt form, 7 was an amorphous tacky solid at ambient temperature which melts at ca. 30° C.

Example 6

Preparation of an LLC Mixture of Compounds 7 and 2

Figure 13:
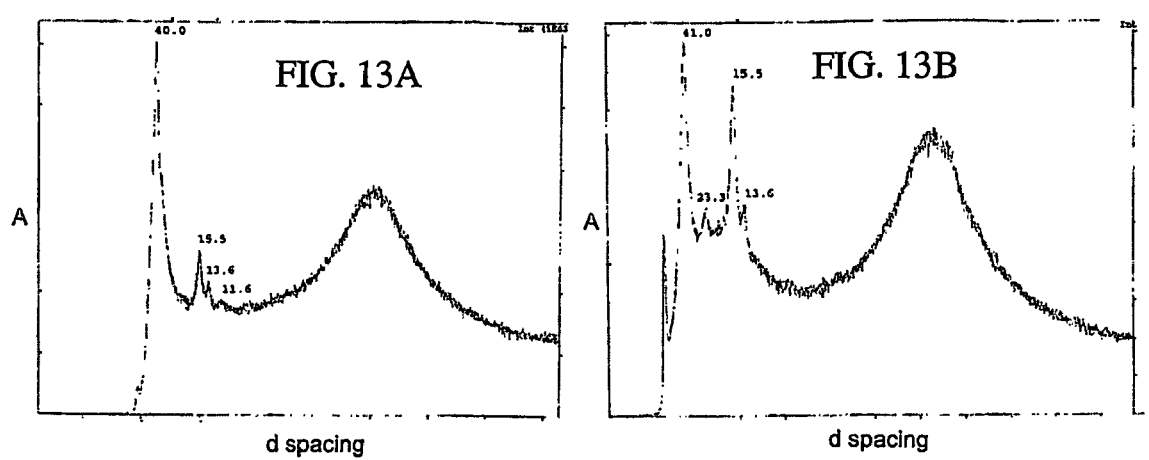
FIG. 13a: XRD profiles of a 5:2 (mol/mol) mixture of monomer 7 and monomer 2 prior to cross-linking.
FIG. 13b: XRD profiles of a 5:2 (mol/mol) mixture of monomer 7 and monomer 2 after cross-linking.

When monomer 7 was thoroughly blended with LLC structure-directing agent 2 in a 5:2 (mol/mol) ratio, the resulting mixture formed an $H_{II}$ phase and could be photo-cross-linked with retention of the phase microstructure. The formation of the $H_{II}$ phase was confirmed by low-angle X-ray diffraction analysis, which showed d-spacings with the ratio $1:1/\sqrt{3}:1/\sqrt{4}:1/\sqrt{7}\ldots$ characteristic of a hexagonal LLC phase. FIGS. 13a and 13b show XRD profiles of a 5:2 (mol/mol) mixture of monomer 7 and monomer 2 prior to and after cross-linking. The labels above the XRD peaks are the d-spacing values in angstroms.

Example 7

Catalysis Results for an LLC Mixture of Compounds 7 and 2

Figure 14:
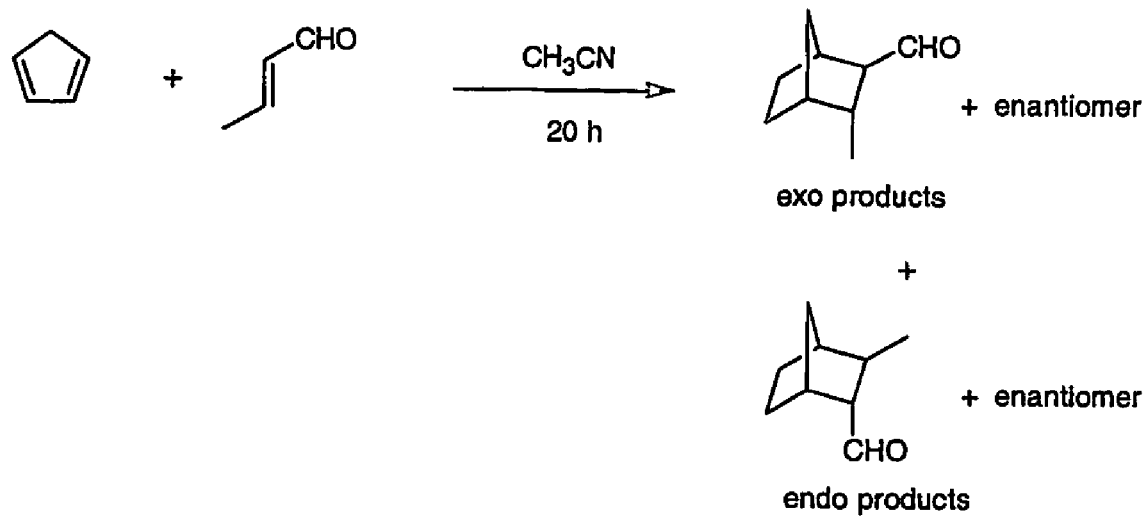
FIG. 14: Cycloaddition of cyclopentadiene with crotyl aldehyde in acetonitrile solvent under mild conditions.

Heterogeneous catalysis studies of the powdered form of the cross-linked $H_{II}$ phase of a 5:2 mol/mol mixture of 7 and 2 revealed that the nanostructured resin was able to catalyze the cycloaddition of cyclopentadiene with crotyl aldehyde in acetonitrile solvent under mild conditions (FIG. 14). The yields and enantioselectivity of the heterogeneous LLC D-A catalyst resin were slightly lower than that of the original solution catalyst 8. However, it should be noted that the cited reaction enantioselectivity results are conservative, unoptimized figures. Enantiomeric excess (ee) values of over 90% have been observed for certain batches of prepared LLC D-A catalyst resin. The enantiomeric excess is the yield of the more abundant enantiomer relative to the other enantiomer in an optically active mixture. More importantly, the cross-linked catalytic resin showed slightly higher enantioselectivity over unpolymerized monomer 7 in solution, showing the benefit of a nanostructured environment for catalysis. Control experiments indicated that the catalytic groups were not leached out of the solid into the solution phase, and that the solid catalyst can be recycled with good recovery of its initial catalytic reactivity and enantioselectivity.

TABLE 2

| Catalyst | Reaction Enantioselectivity | | | | |
|---|---|---|---|---|---|
| | Catalyst batch 1 | | Catalyst batch 2 | | Average |
| | Sample 1 | Sample 2 | Sample 1 | Sample 2 | ee values |
| Monomer 7 in soln | 35% ee | 71% ee | 35% ee | — | 59% ee |
| LLC D-A resin (x-linked 5:2 mol/mol monomers 7 and 2) | 73% ee | 79% ee | 73% ee | 71% ee | 74% ee |

(a) diastereoselectivity (endo/exo products) = ca. 1.2:1
(b) ee values are cited for the enantiomers of the endo product only The foregoing examples are provided for illustrative purposes, and are not intended to limit the scope of the invention. Any variations in the materials and methods herein which would occur to the skilled artisan from the inventive teachings herein are within the scope and spirit of the present invention.

We claim:

1. A cross-linked co-polymerized lyotropic liquid crystal (LLC) polymer comprising ordered nanopores, the walls of the nanopores comprising a multiplicity of functional groups, wherein the LLC polymer is a co-polymer of a first monomer which is a LLC monomer having strong LLC character, the first monomer comprising a first headgroup, a first polymerizable platform, and a first hydrogen-bonding linkage between the first headgroup and the first polymerizable platform, and a second monomer comprising a second headgroup comprising a functional group, a second polymerizable platform, and a second hydrogen-bonding linkage between the second headgroup and the second polymerizable platform.

2. The LLC polymer of claim 1 wherein the functional group is an acidic group.

3. The LLC polymer of claim 2 wherein the functional group is a Bronsted acid.

4. The LLC polymer of claim 1 wherein the functional group is a basic group.

5. The LLC polymer of claim 1, wherein the functional group is a catalytic group.

6. The LLC polymer of claim 5 wherein the catalytic group is selected from the group consisting of organic coupling catalysts, oxidation catalysts, reduction catalysts, polymerization catalysts, and hydrolysis catalysts.

7. The LLC polymer of claim 1 wherein the functional group is an oxidizing agent.

8. The LLC polymer of claim 1 wherein the functional group is a reducing agent.

9. The LLC polymer of claim 1 wherein the functional group is a polymerization initiator.

10. The LLC polymer of claim 1 wherein the functional group is a binding agent.

11. The LLC polymer of claim 10 wherein the binding agent is selected from the group consisting of chiral binding agents, molecular receptors, biological receptors, and complexing agents for metal ions, or gases.

12. The LLC polymer of claim 1 wherein the functional group is a chiral group.

13. The LLC polymer of claim 1 wherein the functional group is an electrically active group.

14. The LLC polymer of claim 1, wherein the first monomer forms an inverted hexagonal ($H_{II}$) phase.

15. The LLC polymer of claim 1 wherein the first monomer forms a bicontinuous cubic phase.

16. The LLC polymer of claim 1 wherein the first monomer is an amino acid-based monomer.

17. The LLC polymer of claim 1 wherein the ratio of the first monomer to the second monomer is between about 1:5 to about 5:1.

18. A method of preparing a cross-linked functionalized lyotropic liquid crystal (LLC) polymer comprising:
   a. providing a first monomer which is an LLC monomer having strong LLC character, the first monomer comprising a first headgroup, a first polymerizable platform, and a first hydrogen-bonding linkage between the first headgroup and the first polymerizable platform;
   b. providing a second monomer having either weak or no LLC character, the second monomer comprising a second headgroup comprising a functional group, a second polymerizable platform, and a second hydrogen-bonding linkage between the second headgroup and the second polymerizable platform;
   c. blending the first monomer, the second monomer, a polar solvent and a polymerization initiation, thereby allowing the self-assembly of the first and second monomer into an LLC phase having an LLC microstructure; and
   d. cross-linking the LLC phase comprising a monomer mixture with retention of the LLC micro structure.

19. The method of claim 18 wherein the functional group is an acidic group.

20. The method of claim 19 wherein the functional group is a Bronsted acid.

21. The method of claim 18 wherein the functional group is a basic group.

22. The method of claim 18, wherein the functional group is a catalytic group.

23. The method of claim 22 wherein the catalytic group is selected from the group consisting of organic coupling catalysts, oxidation catalysts, reduction catalysts, polymerization catalysts, and hydrolysis catalysts.

24. The method of claim 18, wherein the functional group is an oxidizing group.

25. The method of claim 18, wherein the functional group is a reducing group.

26. The method of claim 18, wherein the functional group is a polymerization initiator.

27. The method of claim 18 wherein the functional group is a binding agent.

28. The method of claim 27 wherein the binding agent is selected from the group consisting of chiral binding agents, molecular receptors, biological receptors, and complexing agents for metal ions, or gases.

29. The method of claim 18 wherein the functional group is a chiral group.

30. The method of claim 18 wherein the functional group is an electrically active group.

31. The method of claim 18, wherein the first monomer forms an inverted hexagonal ($H_{II}$) phase.

32. The method of claim 18 wherein the first monomer forms a bicontinuous cubic phase.

33. The method of claim 18 wherein the first monomer is an amino acid-based monomer.

34. The method of claim 18 wherein the ratio of the first monomer to the second monomer is between about 1:5 to about 5:1.

35. The method of claim 18 wherein the solvent is selected from the group consisting of water, organic solvents, and combinations thereof.

* * * * *